(12) United States Patent
Yamato

(10) Patent No.: US 12,056,475 B2
(45) Date of Patent: *Aug. 6, 2024

(54) OFFLOAD SERVER, OFFLOAD CONTROL METHOD, AND OFFLOAD PROGRAM

(71) Applicant: Nippon Telegraph and Telephone Corporation, Tokyo (JP)

(72) Inventor: Yoji Yamato, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 119 days.

This patent is subject to a terminal disclaimer.

(21) Appl. No.: 17/797,188

(22) PCT Filed: Feb. 4, 2020

(86) PCT No.: PCT/JP2020/004202
§ 371 (c)(1),
(2) Date: Aug. 3, 2022

(87) PCT Pub. No.: WO2021/156955
PCT Pub. Date: Aug. 12, 2021

(65) Prior Publication Data
US 2023/0065994 A1    Mar. 2, 2023

(51) Int. Cl.
*G06F 9/44* (2018.01)
*G06F 8/30* (2018.01)
(Continued)

(52) U.S. Cl.
CPC .................. *G06F 8/41* (2013.01); *G06F 8/30* (2013.01); *G06F 11/3466* (2013.01)

(58) Field of Classification Search
CPC . G06F 8/30; G06F 8/41; G06F 8/4441; G06F 8/452; G06F 8/457; G06F 11/3466; Y02D 10/00
See application file for complete search history.

(56) References Cited

U.S. PATENT DOCUMENTS 10,372,497 B1 *   8/2019   Zelenov .................... G06F 9/54
10,540,194 B2 *   1/2020   Koblents ............. G06F 11/3442
(Continued)

OTHER PUBLICATIONS

Yoji Yamato, Proposal of Automatic GPU Offloading Technology on Open IoT Environment, 2018, pp. 634-638. https://ieeexplore.ieee.org/stamp/stamp.jsp?tp=&arnumber=8377937 (Year: 2018).*
Pasquale Cantiello, Compilers, Techniques, and Tools for supporting programming heterogeneous many/multicore systems, 2014, pp. 1-24. https://ieeexplore.ieee.org/xpl/ebooks/bookPdfWithBanner.jsp?fileName=6674271.pdf&bkn=6670810&pdfType=chapter (Year: 2014).*

(Continued)

*Primary Examiner* — Mongbao Nguyen
(74) *Attorney, Agent, or Firm* — Fish & Richardson P.C.

(57) ABSTRACT

An offload server includes: an application code analysis section configured to analyze source code of an application; a data transfer designation section configured to, on the basis of a result of the code analysis, designate a data transfer to be collectively performed on, before starting GPU processing and after finishing the GPU processing, of variables that need to be transferred between a CPU and a GPU, those which are not mutually referenced nor mutually updated between CPU processing and the GPU processing and which are only to be returned to the CPU as a result of the GPU processing; a parallel processing designation section configured to identify loop statements in the application, and, for each of the identified loop statements, specify a statement specifying application of parallel processing by the GPU and perform compilation.

18 Claims, 13 Drawing Sheets

(51) Int. Cl.
*G06F 8/41* (2018.01)
*G06F 9/445* (2018.01)
*G06F 9/455* (2018.01)
*G06F 11/34* (2006.01)

(56) References Cited

U.S. PATENT DOCUMENTS

| | | | |
|---|---|---|---|
| 2014/0325495 A1* | 10/2014 | Ravi | G06F 9/5027 717/150 |
| 2015/0277877 A1* | 10/2015 | Feng | G06F 8/51 717/160 |
| 2020/0226027 A1* | 7/2020 | Krasner | G06F 11/1423 |
| 2020/0371828 A1* | 11/2020 | Chiou | G06F 9/5055 |
| 2021/0048991 A1* | 2/2021 | Tanner | G06F 17/153 |
| 2021/0132807 A1* | 5/2021 | Crow | G06F 3/0683 |

OTHER PUBLICATIONS

Artem Chikin, Toward an Analytical Performance Model to Select between GPU and CPU Execution, 2019, pp. 1-10. https://dav.uspto.gov/webapp/applicationViewer.html?casenumber=17547630 (Year: 2019).*

Yehia Arafa, Low Overhead Instruction Latency Characterization for NVIDIA GPGPUs, 2019, pp. 1-8. https://ieeexplore.ieee.org/stamp/stamp.jsp?tp=&arnumber=8916466 (Year: 2019).*

Yamato et al., "Automatic GPU Offloading Technology for Open IoT Environment," IEEE Internet of Things Journal, Sep. 2018, 10 pages.

Yamato et al., "Study of parallel processing area extraction and data transfer number reduction for automatic GPU offloading of IoT applications," Journal of Intelligent Information Systems, Aug. 2019, 18 pages.

* cited by examiner

FIG. 6 RELATED ART

```
                                                              CPU
⟨1⟩ for(i=0; i<10; i++){

⟨2⟩ for(j=0; j<20; j++){
            a, b ←— j
            }
    }

⟨3⟩ for(k=0; k<30; k++){
    c, d ←— k
    }

⟨4⟩ for(l=0; l<40; l++){
    e, f ←— l
    }
```

FIG. 8 RELATED ART

```
                                                              CPU
                                                              GPU
    #pragma acc kernels
    #pragma acc data copyin a,b    ←—— o
⟨1⟩ for(i=0; i<10; i++){

⟨2⟩ for(j=0; j<20; j++){
            a, b
            }
    } pragma acc data copyout a,b ←—— p pragma acc kernels
⟨3⟩ for(k=0; k<30; k++){
    c, d
    }

⟨4⟩ for(l=0; l<40; l++){
    e, f
    }
```

FIG. 10

```
                                                            CPU
                                                            GPU
    #pragma acc declare create  ←— s
    #pragma acc data copyin a,b,c,d  ←— o
    #pragma acc update  ←— t pragma acc kernels
    #pragma acc data present a,b  ←— q
⟨1⟩ for(i=0; i<10; i++){

⟨2⟩ for(j=0; j<20; j++){
            a, b
            }
    } pragma acc kernels
    #pragma acc data present c,d  ←— r
⟨3⟩ for(k=0; k<30; k++){
    c, d
    } pragma acc declare create
    #pragma acc data copyout a,b,c,d  ←— p
    #pragma acc update ⟨4⟩ for(l=0; l<40; l++){
    e, f
    }
```

OFFLOAD SERVER, OFFLOAD CONTROL METHOD, AND OFFLOAD PROGRAM

CROSS-REFERENCE TO RELATED APPLICATIONS

This is a National Stage Application of PCT Application No. PCT/JP2020/004202, filed on Feb. 4, 2020. The disclosure of the prior application is considered part of the disclosure of this application, and is incorporated in its entirety into this application.

TECHNICAL FIELD

The present invention relates to an offload server, an offload control method, and an offload program for automatically offloading functional processing to a GPU (Graphics Processing Unit) or the like.

BACKGROUND ART

Heterogeneous computational resources, other than CPUs (Central Processing Units), are increasingly used. For example, image processing has begun to be performed on servers that use an enhanced GPU (accelerator) and signal processing has begun to be accelerated by an FPGA (accelerator). An FPGA is a programmable gate array that can be configured by a person such as a designer after manufacture and is a type of PLD (Programmable Logic Device). Amazon Web Services (AWS) (registered trademark) provides GPU instances and FPGA instances and these resources can be used on-demand as well. Microsoft (registered trademark) is using FPGAs to increase search efficiency.

In an OpenIoT (Internet of Things) environment, a wide variety of applications are expected to be created using service coordination techniques and the like, and operational applications are expected to be improved in performance by exploiting further advanced hardware. To that end, however, programing and settings adapted to the hardware to be operated are required. For example, a lot of technical knowledge regarding techniques such as CUDA (Compute Unified Device Architecture) and OpenCL (Open Computing Language) is required, making the programing and settings challenging. OpenCL is an open API (Application Programming Interface) that can uniformly handle any computational resources (not limited to CPUs and GPUs) without being bound to specific hardware.

In order to allow GPUs and FPGAs to be readily used in user's IoT applications, the following is required: when deploying a general application such as an image processing or cryptographic processing application to run in an OpenIoT environment, it is desirable that an OpenIoT platform analyze application logics and automatically offloads processing to a GPU/FPGA.

CUDA, which is a development environment for GPGPU (General Purpose GPU) which uses computational capability of a GPU for other processing in addition to image processing, are evolving. CUDA is a development environment for GPGPUs. Further, OpenCL has emerged as a standard for uniformly handling heterogeneous hardware such as GPUs, FPGAs, and many-core CPUs.

In CUDA and OpenCL, programming is performed using extensions of the C programming language. However, the difficulty of such programming is high because it requires describing memory-to-memory copy/release operations between a CPU and devices like GPUs. In fact, not many engineers can make full use of CUDA and OpenCL.

There is known a technique in which, for the purpose of using a GPGPU simply, portions to be processed in parallel, such as loop statements, are designated in a directive-based language and a compiler compiles them into device-specific code in accordance with the directives. Technical specifications include OpenACC (Open Accelerator) and the like and compilers include PGI Compiler (registered trademark) and the like. In an example using OpenACC, a user specifies, in a code written in C/C++/Fortran language, an OpenACC directive to cause parallel processing to be performed. The PGI Compiler checks the parallelizability of the code, generates execution binaries for GPU and CPU, and converts them to execution modules. IBM JDK (registered trademark) supports a function of offloading designation of parallel processing in accordance with the lambda format of Java (registered trademark) to a GPU. Using these techniques, programmers need not be aware of, for example, data allocation to GPU memory.

In this way, offload processing to a GPU or an FPGA has been enabled by techniques such as OpenCL, CUDA and OpenACC.

However, while offload processing has been enabled, there are many problems to be addressed for appropriate offloading. For example, there are compilers with automatic parallelization functions. Such compilers includes Intel compiler (registered trademark). For automatic parallelization, parallel processing portions, such as for statements (iteration statements), in a program are extracted. However, when parallel processing is performed using a GPU, it is often unable to achieve good performance due to data exchange overhead between a CPU memory and a GPU memory. To accelerate by using a GPU, a skilled person has to perform tuning in OpenCL or CUDA and to search for appropriate parallel processing portions by using PGI Compiler or the like.

For this reason, it is difficult for an unskilled user to improve the performance of an application by using a GPU. In addition, even when using an automatic parallelization technique, much time is taken for trial-and-error tuning to determine whether to parallelize for statements or not before starting use of the application.

Examples of attempts to automate trial-and-error on parallel processing portions include Non-Patent Literatures 1 and 2. Non-Patent Literatures 1 and 2 attempt to appropriately extract loop statements suitable for offloading to a GPU by repeating performance measurements in a verification environment using an evolutionary computation technique and to collectively perform a transfer of variables between a CPU and a GPU in nested loop statements at an outermost possible loop, to achieve automatic acceleration.

CITATION LIST

Non-Patent Literature

Non-Patent Literature 1: Y. Yamato, T. Demizu, H. Noguchi and M. Kataoka, "Automatic GPU Offloading Technology for Open IoT Environment," IEEE Internet of Things Journal, September 2018.

Non-Patent Literature 2: Y. Yamato, "Study of parallel processing area extraction and data transfer number reduction for automatic GPU offloading of IoT applications," Journal of Intelligent Information Systems, Springer, DOI: 10.1007/s10844-019-00575-8, August 2019.

SUMMARY OF THE INVENTION

Technical Problem

Non-Patent Literatures 1 and 2 attempt to automatically extract appropriate parallel processing areas for offloading to a GPU from general code intended for use with CPUs and to search for appropriate parallel processing areas using a GA (genetic algorithm) on parallelizable loop statements, thereby to achieve automatic offloading to the GPU. However, it can be said that automatic acceleration that uses OpenACC does not sufficiently improve the performance of many applications, in comparison with manual acceleration that uses CUDA. The techniques of Patent Literatures 1 and 2 are premised on automatic acceleration that uses OpenACC and their performance improvement is not satisfactory in comparison with the improvement that can be achieved by manual acceleration that uses CUDA.

The present invention has been made in light of these circumstances and an object of the present invention is to further accelerate offloading by reducing the number of transfers between a CPU and a GPU.

Means for Solving the Problem

To solve the problem described above, provided is an offload server that offloads specific processing of an application to a GPU, the offload server comprising: one or more hardware processors: an application code analysis section, implemented using one or more of the one or more hardware processors, configured to analyze source code of an application: a data transfer designation section, implemented using one or more of the one or more hardware processors, configured to, on the basis of a result of the code analysis, designate a data transfer to be collectively performed on, before starting GPU processing and after finishing the GPU processing, of variables that need to be transferred between a CPU (Central Processing Unit) and the GPU, those which are not mutually referenced nor mutually updated between CPU processing and the GPU processing and which are only to be returned to the CPU as a result of the GPU processing; a parallel processing designation section, implemented using one or more of the one or more hardware processors, configured to identify loop statements in the application, and, for each of the identified loop statements, specify a statement specifying application of parallel processing by the GPU and perform compilation: a parallel processing pattern generation section, implemented using one or more of the one or more hardware processors, configured to exclude, from loop statements to be offloaded, any loop statement at which a compilation error occurs and to generate a plurality of parallel processing patterns each of which specifies whether to perform parallel processing for each of the loop statements at which no compilation error occurs: a performance measurement section, implemented using one or more of the one or more hardware processors, configured to, for each of the plurality of parallel processing patterns, compile the application according to the parallel processing pattern, deploy the compiled application to an accelerator verification device, and perform processing for a measurement of a performance obtained when offloading the compiled application to the GPU according to the parallel processing pattern: and an execution file generation section, implemented using one or more of the one or more hardware processors, configured to select a parallel processing pattern with a highest processing performance as a solution from the plurality of parallel processing patterns on the basis of a result of the measurement of the performance, and compile the application according to the parallel processing pattern with the highest processing performance to generate an execution file.

Effect of the Invention

According to the present invention, offloading can be further accelerated by reducing the number of transfers between a CPU and a GPU.

BRIEF DESCRIPTION OF THE DRAWINGS

FIG. 6 is a diagram illustrating an example of a conventional CPU program in a comparative example.

FIG. 8 is a diagram illustrating example loop statements in a case where data is transferred from a CPU to a GPU by the offload server according to the embodiment and nest batching is used.

FIG. 10 is a diagram illustrating example loop statements in a case where data is transferred from the CPU to the GPU by the offload server employing collective transfers and using a temporary area according to the embodiment.

DESCRIPTION OF EMBODIMENTS

Figure 1:
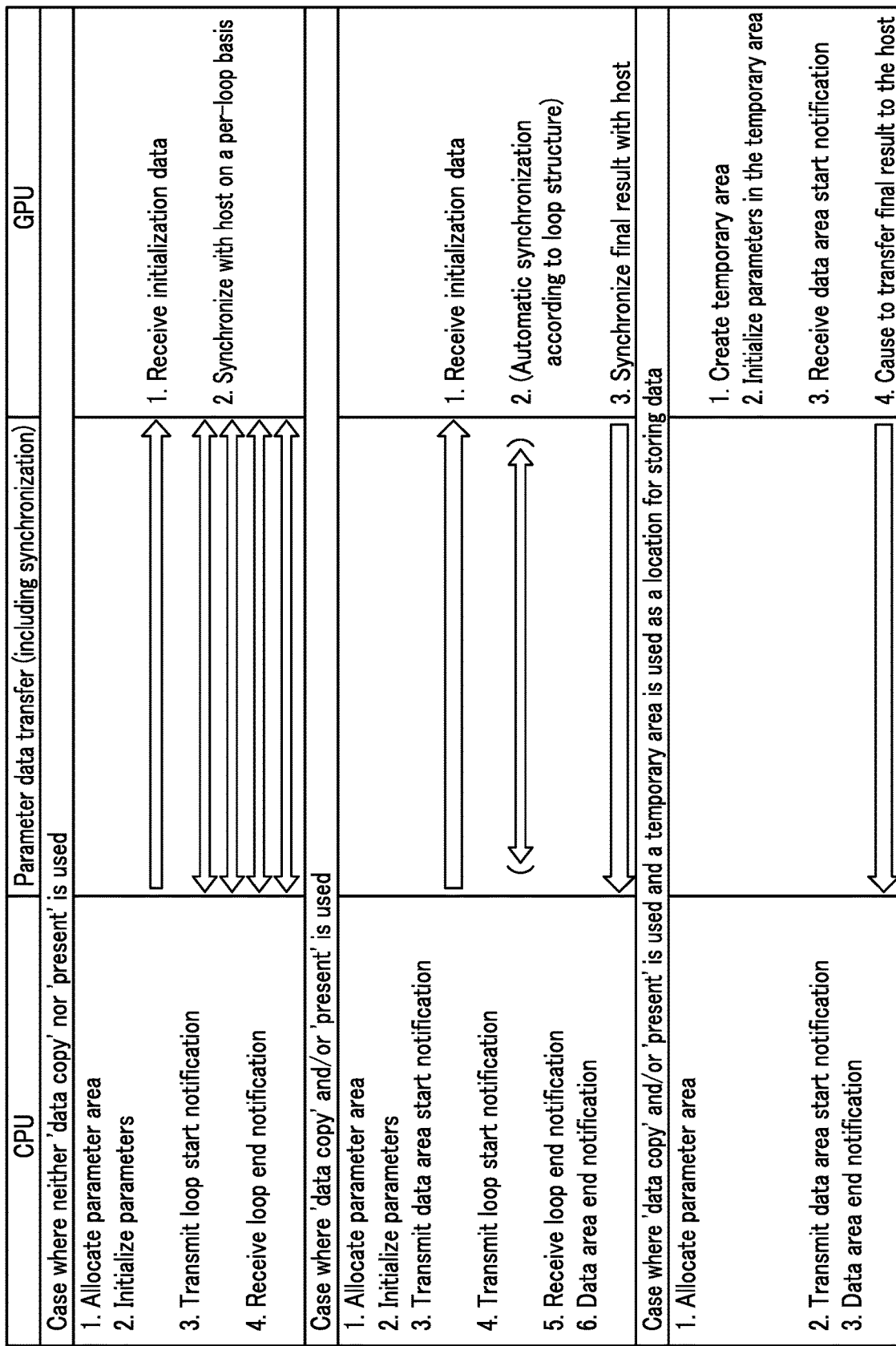
FIG. 1 is a diagram for explaining transfer of parameter and data between a CPU and a GPU in each of a "case where neither 'data copy' nor 'present' is used", a "case where 'data copy' and/or 'present' is used", and a "case where 'data copy' and/or 'present' is used and a temporary area is used as a location for storing data".

An offload server in a mode for carrying out the present invention (hereinafter referred to as "the present embodiment") will be described below with reference to the drawings.

DESCRIPTION OF BACKGROUND

There are a wide variety of applications that one may desire to offload. Moreover, in applications involving a large amount of computation and consuming computation time, such as image analysis for video processing and machine learning processing for analyzing sensor data, a lot of time is spent on repetitive processing with loop statements. Therefore, acceleration by automatically offloading loop statements to a GPU is conceivable.

There are the following fundamental problems with automatic offloading of loop statements to a GPU: Even if a compiler is possibly able to find the restriction like "this loop statement cannot be processed in parallel processing with a GPU", it is difficult at present for the compiler to find appropriateness like "this loop statement is appropriate for parallel processing with a GPU". In addition, it is considered that, in general, loop statements with higher computation density, such as loop statements with many loop iterations, are more appropriate for automatic offloading to a GPU. However, it is difficult to predict how much performance improvement can be achieved, without actual measurement. For these reasons, conventionally, instructions to offload loop statements to a GPU are manually provided and performance measurement is performed in a trial and error fashion.

In light of the above-described problems, Non-Patent Literature 1 proposes to, using a GA (Genetic Algorithm), automatically detect appropriate loop statements to be offloaded to a GPU. In particular, Non-Patent Literature 1 proposes to: first check a general program, which is not intended to be parallelized, for parallelizable loop statements: then represent the parallelizable loop statements as a gene by assigning a value of 1 to each loop statement to be executed on a GPU and assigning a value of 0 to each loop statement to be executed on a CPU: and then repeat a performance verification trial in a verification environment to search for appropriate areas. By narrowing down to parallelizable loop statements and retaining and recombining accelerable parallel processing patterns in the form of portions of genes, a pattern that can be efficiently accelerated can be searched for from among a huge number of possible parallel processing patterns.

In the case of Non-Patent Literature 1, variables used in nested loop statements are transferred between a CPU and a GPU when the loop statements are offloaded to the GPU. However, when a transfer is performed between the CPU and the GPU at a low nesting level, transfer is performed in each iteration of the low-level loop, which is not efficient.

Non-Patent Literature 2 proposes that variables that can be transferred between a CPU and a GPU at a high nesting level without problem be collectively transferred at the high nesting level. This approach has a certain effect on acceleration by reduction in the number of transfers because loops with many loop iterations, which take long processing time, are often nested.

In the cases of Non-Patent Literatures 1 and 2, automatic acceleration of medium-size applications that include more than 100 loop statements have been actually observed. For the purpose of practicality, more acceleration is desired.

(Basic Concept)

A basic concept of the present invention will be described.

It can be said that automatic acceleration that uses OpenACC does not sufficiently improve the performance of many applications, in comparison with manual acceleration that uses CUDA. Acceleration methods according to CUDA include, under the major premise of parallelization of sequential processing, reduction of the number of data transfers between a CPU and a GPU and appropriate use of multiple memories (shared memory, constant memory, texture memory, local memory, and global memory). Further, the acceleration methods according to CUDA include coreless access, suppression of branches within a Warp, improvement of occupancy by Warp simultaneous multi-threading, stream-based task parallelism, parallelism granularity tuning appropriate for the number of threads, and the like. Among these, in terms of the transfer speed, reduction of the number of transfers between the CPU and the GPU provides a greater effect on the acceleration than improving memory efficiency in the GPU. In view of this, description will be given of possibility of reduction by paying attention to variables other than nested loop variables.

<Reduction of Transfers Between CPU and GPU>

In order to reduce the number of transfers between a CPU and a GPU, the present invention transfers variables of nested loops, at an outermost possible level, and, in addition, (1) concentrates the timing of transferring many variables and (2) reduces the number of transfers that are caused by the compiler automatically.

To offload processing to a GPU, CPU-GPU transfer inevitably occurs. The present invention achieves acceleration through reduction of the number of transfers by concentrating the timing of transfers of variables and reducing unnecessary transfers.

(1) Concentrating Timing of Transfers of Many Variables

To reduce the number of transfers, variables are transferred not only on a per nested-loop basis but are transferred such that variables for which the timing of transferring to the GPU can be concentrated are collectively transferred. For example, variables defined on a CPU and used in a plurality of loop statements, except those which are obtained as a result of processing by the GPU, then processed on the CPU, and then processed on the GPU again, can be collectively transferred to the GPU before the start of the GPU processing and can be returned to the CPU after the completion of the entire GPU processing.

As the loops and reference relationships between variables are identified when the code is analyzed, on the basis of the result thereof, a 'data copy' statement of OpenACC ('data copy' of OpenACC) is used to designate a transfer of collectively transferring, of the variables defined in the plurality of files, those for which the GPU processing and the CPU processing are not nested and thus it is possible to separate the GPU processing and the CPU processing. In addition, variables that have been collectively transferred and do not need to be transferred at the timing are explicitly indicated using a 'data present' statement of OpenACC ('data present' of OpenACC). It should be noted that the 'present' statement is a clause that explicitly indicates that variables are already present on a GPU.

(2) Reduction of the Number of Transfers Automatically Performed by a Compiler

A description will be given of reduction of the number of transfers in a case where a compiler automatically performs the transfers.

FIG. 1 is a diagram for explaining transfer of parameter and data between a CPU and a GPU in each of a "case where neither 'data copy' nor 'present' is used", a "case where 'data copy' and/or 'present' is used", and a "case where 'data copy' and/or 'present' is used and a temporary area is used as a location for storing data".

The one-directional arrows (=>) in FIG. 1 indicate data transfer from the CPU to the GPU or from the GPU to the CPU. The bidirectional arrows (<=>) in FIG. 2 indicate bidirectional data transfer between the CPU and GPU.

In FIG. 1, the "case where neither 'data copy' nor 'present' is used" represents a case of the PGI Compiler, which is well-known as the compiler of OpenACC. In particular, regarding allocation of a parameter area and initialization of parameters, the CPU transfers parameter data to the GPU and the GPU receives the initialization data.

Regarding loop start notification transmission and loop end notification reception, parameter data transfers from the CPU to the GPU or bidirectional parameter data transfers from the GPU to CPU and from the CPU to the GPU are performed. In particular, the CPU sends a loop start notification to the GPU and receives a loop end notification. This allows the GPU to synchronize with the host (here, the CPU) on a per-loop basis.

In this way, when GPU processing is simply specified for a loop by a #pragma acc kernels clause without using a 'data copy' and/or 'present" clause of OpenACC, variables in the loop are synchronized between the CPU and GPU on a per-loop basis.

In FIG. 1, the "case where 'data copy' and/or 'present' is used" is the case described in Non-Patent Literature 2. In particular, in the "case where 'data copy' and/or 'present' is used" in FIG. 1, in addition to the allocation of a parameter area and the initialization of parameters, even for a data area start notification transmission, the CPU transfers parameter data to the GPU and the GPU receives the initialization data.

The loop start notification transmission is a synchronized transfer between the CPU and the GPU. Viewing from the GPU, automatic synchronization is performed according to the loop configuration. Then, the CPU receives a loop end notification from the GPU and accordingly notifies the GPU of the end of the data area. The GPU sends to the CPU a final result to the host (here, the CPU) and synchronizes with the host.

In the case of Non-Patent Literature 2, even when 'data copy' and/or 'present' is specified according to OpenACC, an automatic transfer of variables between a CPU and a GPU may be caused by a compiler in some cases. As the compiler basically performs processing on the safe side, transfer occurs on the basis of multiple conditions such as whether variables are global variables or local variables, where the variables are initialized, whether the variables are obtained from other functions including a loop, whether the variables are only referenced in a loop, and whether the variables are updated in a loop, even when the transfer is unnecessary in a manner of depending on the compiler.

The "case where 'data copy' and/or 'present' is used and a temporary area is used as a location for storing data", illustrated in FIG. 1, represents a case according to the present invention.

According to the present invention, in order to reduce the number of transfers that are not intended by OpenACC instructions but degrade the performance, a temporary area is created and parameters are initialized in the temporary area and used for transfer between the CPU and the GPU, thereby avoiding unnecessary transfers between the CPU and the GPU.

In particular, according to the present invention, a temporary area is created on a GPU and parameters are created in the temporary area, as illustrated in the "case where 'data copy' and/or 'present' is used and a temporary area is used as a location for storing data" in FIG. 1. The creation of parameters in the temporary area is a novel idea.

As illustrated in the "case where 'data copy' and/or 'present' is used and a temporary area is used as a location for storing data" in FIG. 1, the CPU receives a data area start notification from the GPU and the GPU sends to the CPU a final result to the host (here, the CPU) and synchronizes with the host.

Embodiment

An offload server 1 and others in a mode for carrying out the present invention (hereinafter referred to as "present embodiment") will now be described.

Figure 2:
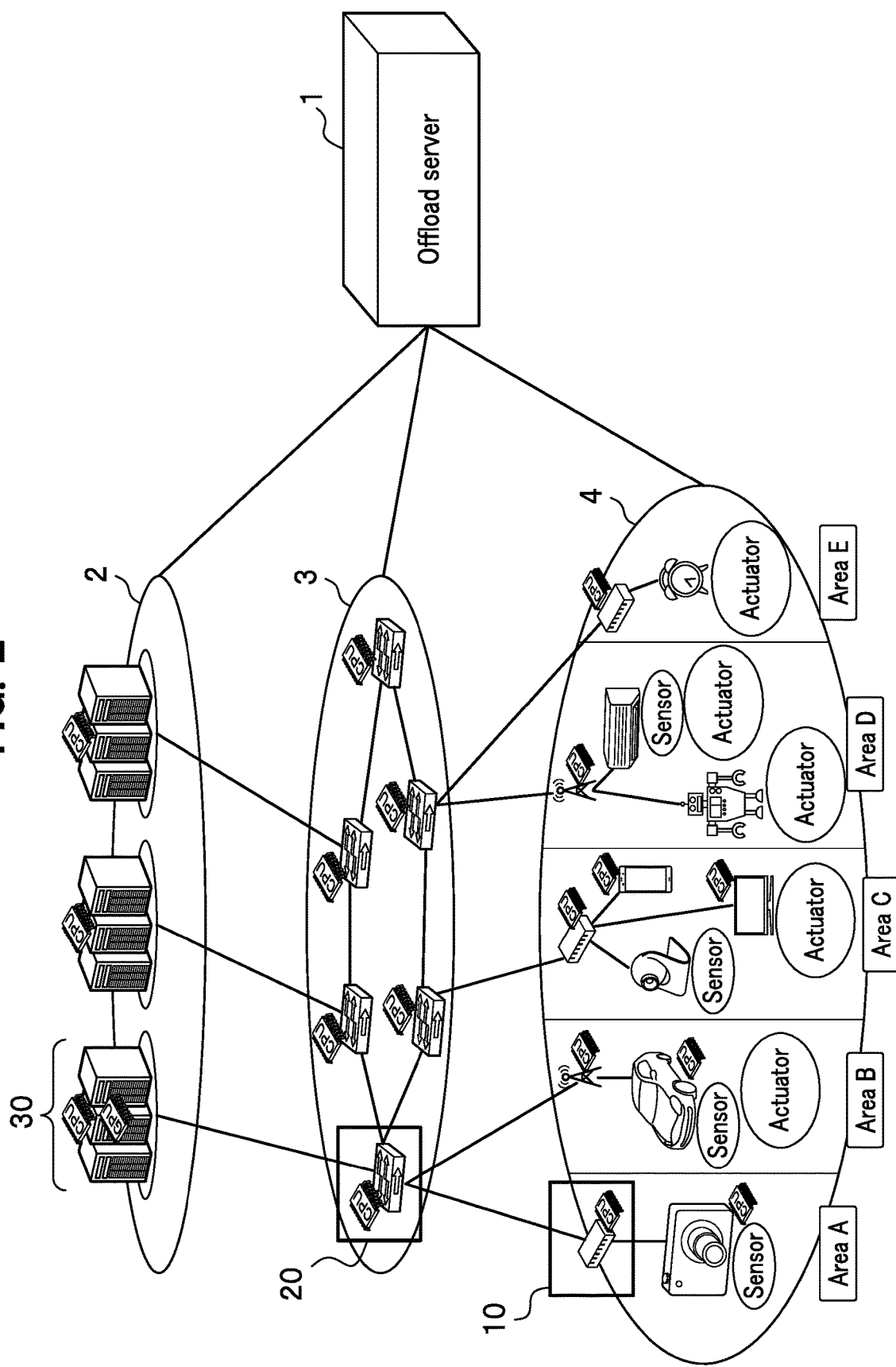
FIG. 2 is a diagram illustrating an environment adaptive software system including an offload server according to an embodiment of the present invention.

FIG. 2 is a diagram illustrating an environment adaptive software system including an offload server 1 according to the present embodiment, to which system the basic concept of the present invention has been applied.

The environment adaptive software system according to the present embodiment is characterized by including the offload server 1 in addition to the configuration of a conventional environment adaptive software. The offload server 1 is an offload server that offloads specific processing of an application to an accelerator. Further, the offload server 1 is communicatively connected to devices located in three layers, namely, a cloud layer 2, a network layer 3 and a device layer 4. Data centers 30 are deployed in the cloud layer 2, network edges 20 are deployed in the network layer 3, and gateways 10 are deployed in the device layer 4.

The environment adaptive software system including the offload server 1 according to the present embodiment achieves efficiency enhancement by appropriately performing function deployment and processing offloading in each of the device layer 4, the network layer 3, and the cloud layer 2. The environment adaptive software system achieves, primarily: function deployment efficiency enhancement for deploying functions in appropriate places in three layers to perform processes: and efficiency enhancement by offloading the functional processing, such as image analysis, to heterogeneous hardware, such as GPUs and FPGAs (Field Programmable Gate Arrays). In the cloud layer, an increasing number of servers including heterogeneous HW (hardware) (hereinafter referred to as "hetero device") such as GPUs and FPGAs are used. For example, FPGAs are also used in Bing Search provided by Microsoft (registered trademark) Corporation. In this way, performance enhancement is achieved by exploiting hetero devices to offload matrix calculations and the like, for example, to a GPU and offload specific processing such as FFT (Fast Fourier Transform) computation to an FPGA.

Hereinafter, a description will be given of an example configuration in which the offload server 1 according to the present embodiment performs offload processing in the background while services for users are being used in the environment adaptive software system.

Figure 3:
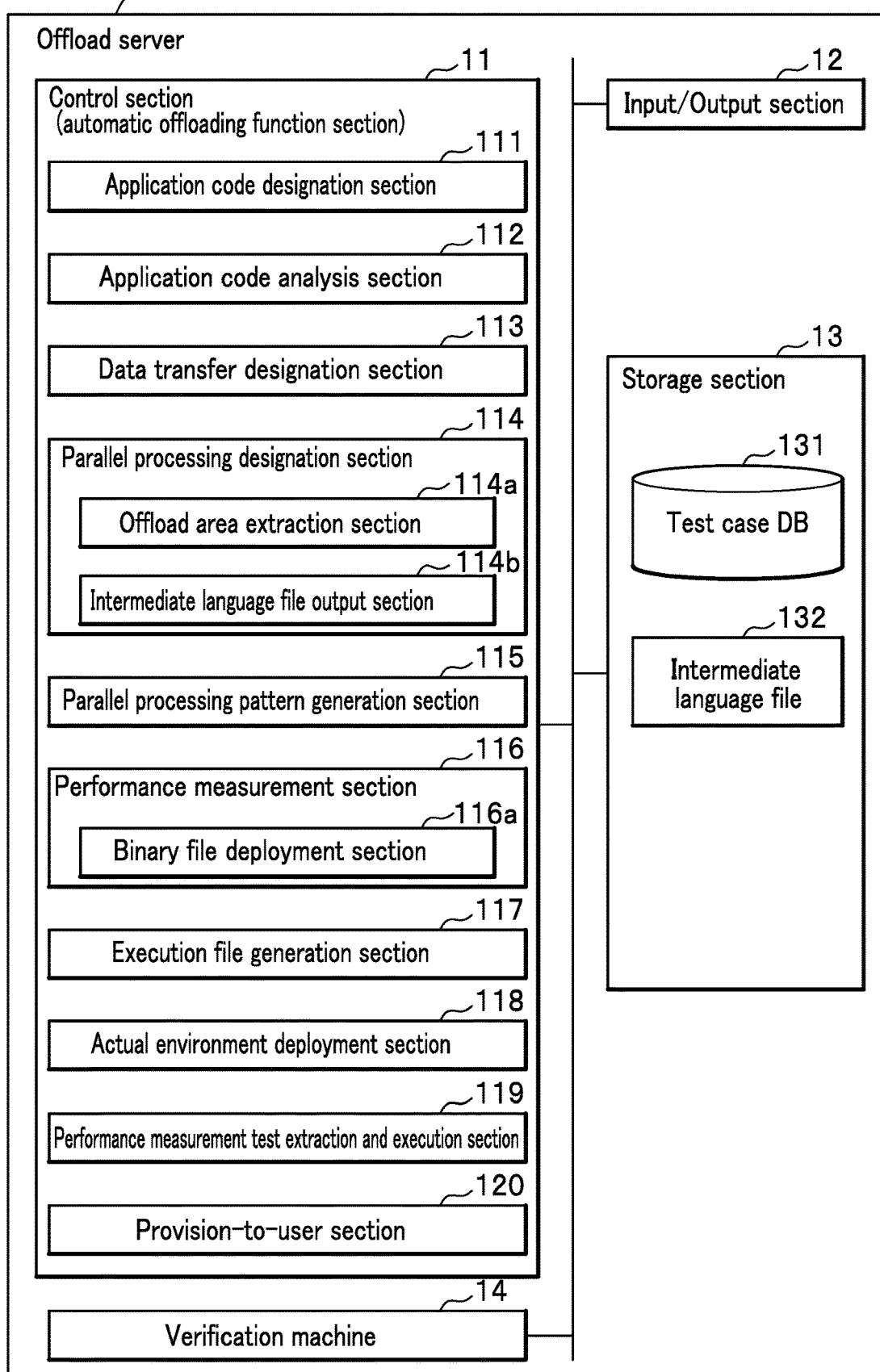
FIG. 3 is a functional block diagram illustrating an example configuration of the offload server according to the embodiment.

FIG. 3 is a functional block diagram illustrating an exemplary configuration of the offload server 1 according to the embodiment of the present invention.

The offload server 1 is a device that automatically offloads specific processing of an application to an accelerator.

As illustrated in FIG. 3, the offload server 1 includes a control section 11, an input/output section 12, a storage section 13, and a verification machine 14 (accelerator verification device).

The input/output section 12 includes a communication interface for transmitting and receiving information to and from devices and an input/output interface for sending and receiving information to and from input devices such as a touch panel or a keyboard and output devices such as a monitor.

The storage section 13 includes a hard disk, a flash memory, a RAM (Random Access Memory) and the like.

The storage section 13 stores a test case database (DB) 131 and temporarily stores programs (offload programs) for executing functions of the control section 11 and information (e.g., an intermediate language file (intermediate file) 132) required for processing of the control section 11.

The test case database 131 stores performance test items. The test case database 131 stores information for performing a test for measuring the performance of an application to be accelerated. For example, in the case of a deep learning application for image analysis processing, sample images and test items for testing execution of the image analysis processing.

The verification machine 14 includes, as a verification environment for environment adaptive software, a CPU (Central Processing Unit), a GPU, and an FPGA (accelerator).

The control section 11 is an automatic offloading function section that is responsible for controlling the entire offload server 1. The control section 11 is embodied by a not-illustrated CPU loading a program (offload program) stored in the storage section 13 into the RAM and executing it, for example.

The control section 11 includes an application code designation section 111 (configured to designate application code), an application code analysis section 112 (configured to analyze application code), a data transfer designation section 113, a parallel processing designation section 114, a parallel processing pattern generation section 115, a performance measurement section 116, an execution file generation section 117, an actual environment deployment section 118 (configured to deploy final binary files to actual environment) a performance measurement test extraction and execution section 119 (configured to extract performance test cases and run automatically), and a provision-to-user section 120 (configured to provide price and performance to a user to make determination)

<Application Code Designation Section 111>

The application code designation section 111 designates the input application code. Specifically, the application code designation section 111 identifies the processing function (such as image analysis) of the service being provided to a user.

<Application Code Analysis Section 112>

The application code analysis section 112 analyzes the source code of the processing function to identify structures such as loop statements and calls to an FFT library.

<Data Transfer Designation Section 113>

On the basis of a result of the code analysis, the data transfer designation section 113 designates a data transfer to be collectively performed on, before starting GPU processing and after finishing the GPU processing, of the variables that need to be transferred between the CPU and the GPU, those which are not mutually referenced nor mutually updated between CPU processing and the GPU processing and which are only to be returned to the CPU as the result of the GPU processing.

Here, variables that need to be transferred between the CPU and the GPU are variables acknowledged as defined in a plurality of files or in a plurality of loops, on the basis of the result of code analysis.

The data transfer designation section 113 designates the data transfer to be collectively performed before starting the GPU processing and after finishing the GPU processing, using 'data copy' of OpenACC.

When variables to be processed on the GPU already have been collectively transferred, the data transfer designation section 113 adds a directive clause indicating that transfer is unnecessary.

For variables that have been collectively transferred before the start of the GPU processing and need not be transferred at the timing of loop statement processing, the data transfer designation section 113 uses 'data present' of OpenACC to explicitly indicate that the variables need not be transferred.

The data transfer designation section 113 designates, in the event of transferring data between the CPU and the GPU, a transfer of variables by creating (#pragma acc declare create) a temporary area on the GPU side, storing the data in the temporary area, and then synchronizing (#pragma acc update) the temporary area.

The data transfer designation section 113 designates, on the basis of the result of code analysis, GPU processing for loop statements by using at least one selected from the group of directive clauses, of OpenACC, consisting of the 'kernels' directive clause, the 'parallel loop' directive clause, and the 'parallel loop vector' directive clause.

The 'kernels' directive clause of OpenACC is used for single loops and tightly nested loops.

The 'parallel loop' directive clause of OpenACC is used for non-tightly nested loops.

The 'parallel loop vector' directive clause of OpenACC is used for loops that cannot be parallelized but can be vectorized.

<Parallel Processing Designation Section 114>

The parallel processing designation section 114: identifies loop statements (iteration statements) of the application: designates, using a directive clause of OpenACC, processing on the GPU for each of the iteration statements: and performs compilation.

The parallel processing designation section 114 includes an offload area extraction section 114a (configured to extract offloadable area) and an intermediate language file output section 114b (configured to output intermediate file).

The offload area extraction section 114a identifies processing offloadable to a GPU, such as loop statements, and extracts an intermediate language according to the offload processing.

The intermediate language file output section 114b outputs the extracted intermediate language file 132. The intermediate language extraction is not ended at one time, but is repeated for optimization through execution trials to search for appropriate offload areas.

<Parallel Processing Pattern Generation Section 115>

The parallel processing pattern generation section 115 excludes, from loop statements to be offloaded, any loop statement (iteration statements) at which a compilation error occurs and generates a plurality of parallel processing patterns each of which specifies whether to perform parallel processing for each of the iteration statements at which no compilation error occurs.

<Performance Measurement Section 116>

The performance measurement section 116 compiles the application according to the parallel processing pattern, deploys the compiled application to the verification machine 14, and performs processing for measuring the performance obtained when offloading the compiled application to the GPU.

The performance measurement section 116 includes a binary file deployment section 116a (configured to deploy binary files). The binary file deployment section 116a deploys an execution file derived from the intermediate language to a verification machine 14 equipped with a GPU.

The performance measurement section 116 executes the deployed binary file, measures the performance obtained when offloading is performed and returns the result of the performance measurement to the offload area extraction section 114*a*. In this case, the offload area extraction section 114*a* extracts another parallel processing pattern, and the intermediate language file output section 114*b* carries out a performance measurement for trial based on extracted intermediate language (see reference character e in FIG. 3, which will be described later).

<Execution File Generation Section 117>

The execution file generation section 117 selects a parallel processing pattern with the highest processing performance from all the parallel processing patterns subjected to the performance measurement on the basis of the result of the performance measurement repeated for a predetermined number of times and compiles the application according to the selected parallel processing pattern with the highest processing performance to generate an execution file.

<Actual Environment Deployment Section 118>

The actual environment deployment section 118 deploys the generated execution file to the actual environment for user ("deployment of final binary file to actual environment"). The actual environment deployment section 118 determines a pattern that designates the final offload areas, and deploys the pattern to the actual environment for the user.

<Performance Measurement Test Extraction and Execution Section 119>

After the execution file is deployed, a performance measurement test extraction and execution section 119 extracts performance test items from the test case database 131 and performs a performance test ("deployment of final binary file to actual environment").

After the execution file is deployed, the performance measurement test extraction and execution section 119 extracts performance test items from the test case database 131, and performs an automatic execution of the extracted performance test in order to indicate the performance to the user.

<Provision-to-User Section 120>

The provision-to-user section 120 presents, to the user, information on the price, performance and the like based on the result of the performance test ("provision of information on price, performance and the like to user"). The test case database 131 stores data for automatically performing the test for measuring the performance of the application. The provision-to-user section 120 presents, to the user, the result of the execution of the test data of the test case database 131 and the price of the entire system, which is determined from the unit prices of the resources (e.g., virtual machines, FPGA instances and GPU instances) used in the system. On the basis of the presented information on the price, performance and the like, the user determines whether to start using the service with billing.

[Application of Genetic Algorithm]

The offload server 1 can use an evolutionary computation technique such as GA to optimize offloading. A configuration of the offload server 1 using a GA is as follows.

Specifically, the parallel processing designation section 114 uses the number of loop statements (iteration statements) at which no compilation error occurs as the gene length, according to a genetic algorithm. The parallel processing pattern generation section 115 maps accelerator processing availability to a gene pattern in such a manner that performing accelerator processing is assigned either 1 or 0 and not performing accelerator processing is assigned either the opposite 0 or 1.

The parallel processing pattern generation section 115 prepares as many gene patterns as the specified number of individuals, wherein values of genes of the gene patterns are randomly set as either 1 or 0. The performance measurement section 116 compiles, according to each of the individuals, an application code in which statements specifying application of parallel processing by a GPU are specified and deploys the compiled code to the verification machine 14. The performance measurement section 116 performs processing for measuring the performance on the verification machine 14.

When a gene having the same parallel processing pattern as a former gene appears in an intermediate generation, the performance measurement section 116 does not perform compilation of the application code corresponding to the parallel processing pattern and does not perform performance measurement and uses the same performance measurement value.

In addition, for an application code that causes a compilation error and for an application code with which the performance measurement does not finish within a predetermined time, the performance measurement section 116 handles these cases as time-out cases and sets the performance measurement value to a predetermined time (a long time).

The execution file generation section 117 performs the performance measurement for all the individuals and evaluates them in such a manner that an individual with a shorter processing time is judged as having a higher degree of fitness. The execution file generation section 117 selects, from all the individuals, individuals having degrees of fitness higher than a predetermined value as individuals with high performance and performs crossover and mutation processes on the selected individuals to generate individuals of the next generation. Examples of the selection method include a roulette-wheel selection in which the probability of selection is in proportion to the degree of fitness. After processing for a specified number of generations has been completed, the execution file generation section 117 selects a parallel processing pattern with a highest performance as the solution.

An automatic offloading operation of the offload server 1 configured as described above will be described below.

[Automatic Offload Operation]

The offload server 1 according to the present embodiment is an example applied to GPU automatic offloading of a user application logic as elemental technology of environment adaptive software.

Figure 4:
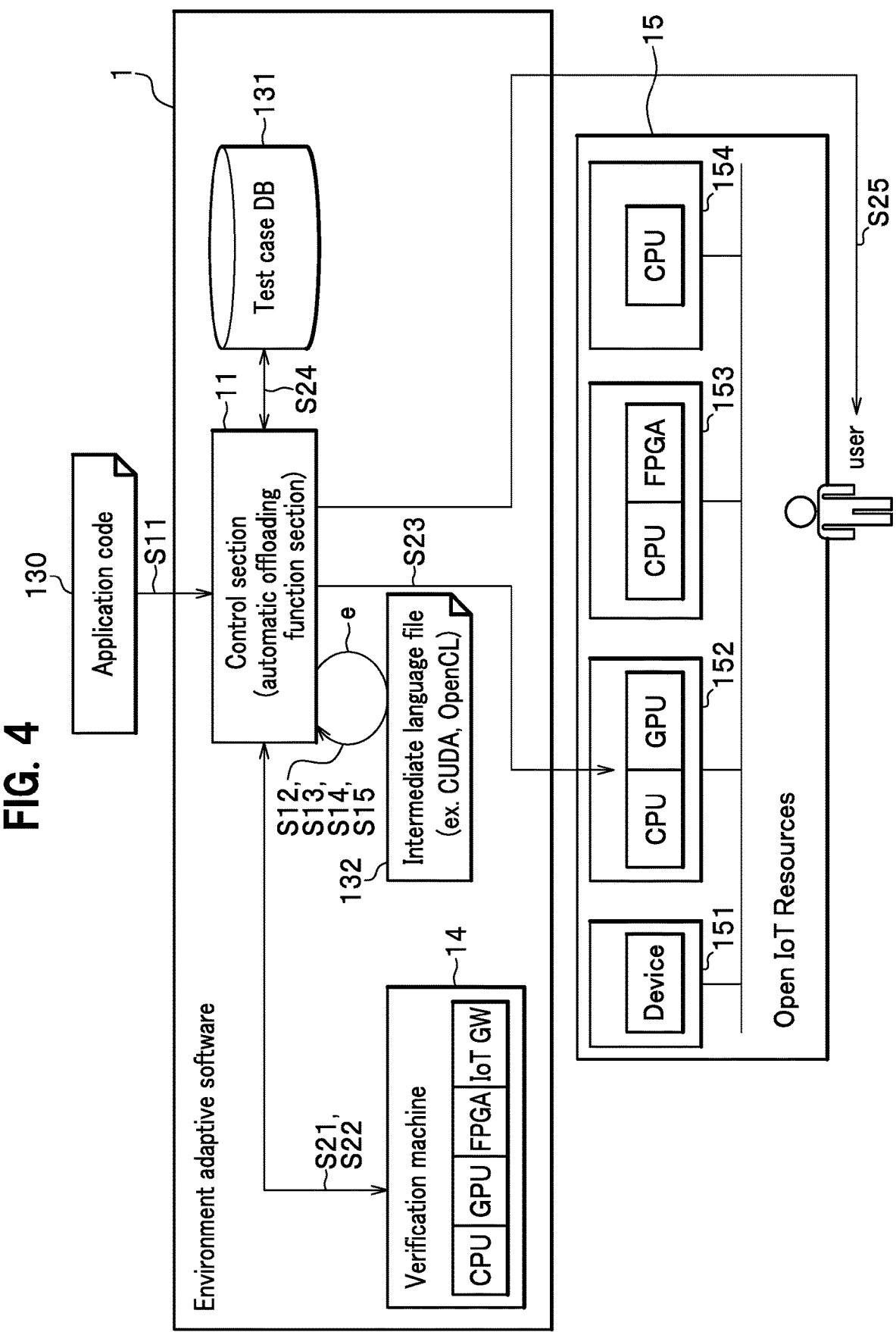
FIG. 4 is a diagram illustrating automatic offloading processing using a GA of the offload server according to the embodiment.

FIG. 4 is a diagram illustrating automatic offloading processing using a GA of the offload server 1.

As illustrated in FIG. 4, the offload server 1 is applied to elemental technology of environment adaptive software. The offload server 1 includes a control section (automatic offloading function section) 11, a test case database 131, an intermediate language file 132, and a verification machine 14.

The offload server 1 acquires application code 130 to be used by a user.

The offload server 1 automatically offloads functional processing to an accelerator of the CPU-GPU-equipped device 152 and to an accelerator of the CPU-FPGA-equipped device 153.

Operations of each section will be described with reference to the step numbers in FIG. 4.

<Step S11: Specify Application Code>

In step S11, the application code designation section 111 (see FIG. 3) identifies the processing function (such as image analysis) of the service being provided to the user. Specifically, the application code designation section 111 designates the input application code.

<Step S12: Analyze Application Code>

In step S12, the application code analysis section 112 (see FIG. 3) analyzes source code of the processing function and identifies structures such as loop statements and calls to an FFT library.

<Step S13: Extract Offloadable Area>

In step S13, the parallel processing designation section 114 (see FIG. 3) identifies loop statements (iteration statements) of the application, specifies processing on a GPU for each of the iteration statements according to OpenACC, and performs compilation. Specifically, the offload area extraction section 114a (see FIG. 3) identifies processing offloadable to a GPU, such as loop statements, and extracts an intermediate language according to the offload processing.

<Step S14: Output Intermediate File>

In step S14, the intermediate language file output section 114b (see FIG. 3) outputs the intermediate language file 132. The intermediate language extraction is not ended at one time, but is repeated for optimization through execution trials to search for appropriate offload areas.

<Step S15: Compile Error>

In step S15, the parallel processing pattern generation section 115 (see FIG. 3) excludes, from loop statements to be offloaded, any loop statement at which a compilation error occurs and generates a plurality of parallel processing patterns each of which specifies whether to perform parallel processing for each of the iteration statements at which no compilation error occurs.

<Step S21: Deploy Binary Files>

In step S21, the binary file deployment section 116a (see FIG. 3) deploys an execution file derived from an intermediate language corresponding to a parallel processing pattern to the verification machine 14 including a GPU. The binary file deployment section 116a launches the deployed file and executes an assumed test case to measure the performance obtained when offloading is performed.

<Step S22: Measure Performances>

In step S22, the performance measurement section 116 (see FIG. 3) executes the deployed file to measure the performance obtained when offloading is performed.

In order to make offload areas more appropriate, the result of the performance measurement is returned to the offload area extraction section 114a. Then, the offload area extraction section 114a extracts another pattern. Then, the intermediate language file output section 114b carries out a performance measurement for trial using the extracted intermediate language (see reference character e in FIG. 4). The performance measurement section 116 repeats the performance measurement on the verification environment and determines a final code pattern to deploy.

As indicated by reference character e in FIG. 4, the control section 11 specifies GPU processing for each iteration statement according to OpenACC and performs compilation.

<Step S23: Deploy Final Binary Files to Actual Environment>

In step S23, the actual environment deployment section 118 determines a pattern that designates the final offload areas, and deploys the pattern to the actual environment for the user.

<Step S24: Extract Performance Test Cases and Run Automatically>

In step S24, after the execution file is deployed, the performance measurement test extraction and execution section 119 extracts performance test items from the test case database 131, and performs an automatic execution of the extracted performance test in order to indicate the performance to the user.

<Step S25: Provide Price and Performance to a User to Judge>

In step S25, the provision-to-user section 120 presents, to the user, information on the price, performance and the like based on the result of the performance test. On the basis of the presented information on the price, performance and the like, the user determines whether to start using the service with billing.

The above-described steps from step S11 to step S25 are performed in the background of service use of the user, and are assumed to be performed on the first day of temporary use of the service, for example.

As described above, when the offload server 1 is applied to an elemental technology of environment adaptive software, the control section (automatic offloading function section) 11 of the offload server 1 extracts the areas to be offloaded from the source code of the application used by the user and outputs an intermediate language, in order to offload functional processing (steps S11 to S15). The control section 11 deploys the execution file derived from the intermediate language to the verification machine 14 and causes the verification machine 14 to execute the execution file to verify the effect of offloading (steps S21 to S22). The control section 11 repeats the verification, then determines appropriate offload areas, and then deploys the execution file to an actual environment that is actually provided to the user, to provide the execution file as a service (steps S23 to S25).

The processing flow of collectively performing the code conversion, the resource amount adjustment, and the deployment place adjustment, which are required for environment adaptation, has been described. However, it should be noted that this is not limiting and only desired processing may be extracted. For example, when only a code conversion is desired to be performed for a GPU, it is possible to use only the environment adaptation function and the verification environment in the steps S11 to S21.

[GPU Automatic Offloading Using GA]

GPU automatic offloading is a process of repeating the process from step S12 to step S22 in FIG. 4 to obtain offload code to be ultimately deployed in step S23.

The GPU is a device that generally does not guarantee latency but is suitable for improving throughput by parallel processing. There are a wide variety of applications to be run in IoT. Typical applications are encryption processing of IoT data, image processing for analysis of camera videos, machine learning processing for analysis of a large amount of sensor data and the like and they include a lot of repetitive processing. In view of this, iteration statements in an application are automatically offloaded to a GPU, thereby improving the speed.

In order to improve the speed, appropriate parallel processing is required as described in the Background Art section. When a GPU is used in particular, it is often the case that when the data size and the number of loop iterations are small, performance cannot be improved due to memory transfer between a CPU and the GPU. Further, due to the timing of memory data transfer, a combination of individual loop statements (iteration statements) that can be processed in parallel for acceleration may not result in the highest speed. For example, even if the first, fifth, and tenth for statements among 10 for statements (iteration statements) can achieve acceleration compared to using the CPU, the combination of the three for statements does not necessarily be the highest speed option.

There is known an attempt of designating an appropriate parallel processing areas by determining whether for statements are parallelizable by trial and error for optimization, by using PGI compiler. However, the trial-and-error approach requires a lot of operations and, in the event of providing the service, delays the start of the service to be used by the user and increases the cost.

In view of this, the present embodiment automatically extracts appropriate offload areas from a general program that does not assume parallelization. For this purpose, the embodiment first checks parallelizable for statements and then, for a group of parallelizable for statements, repeatedly performs a performance verification trial on a verification environment using the GA to search for appropriate areas. By narrowing down to parallelizable for statements and then retaining and recombining accelerable parallel processing patterns in the form of portions of genes, a pattern that can be efficiently accelerated can be searched for from a huge number of possible parallel processing patterns.

[Concept of Search by Control Section (Automatic Offloading Function Section) 11 Using Simple GA]

Figure 5:
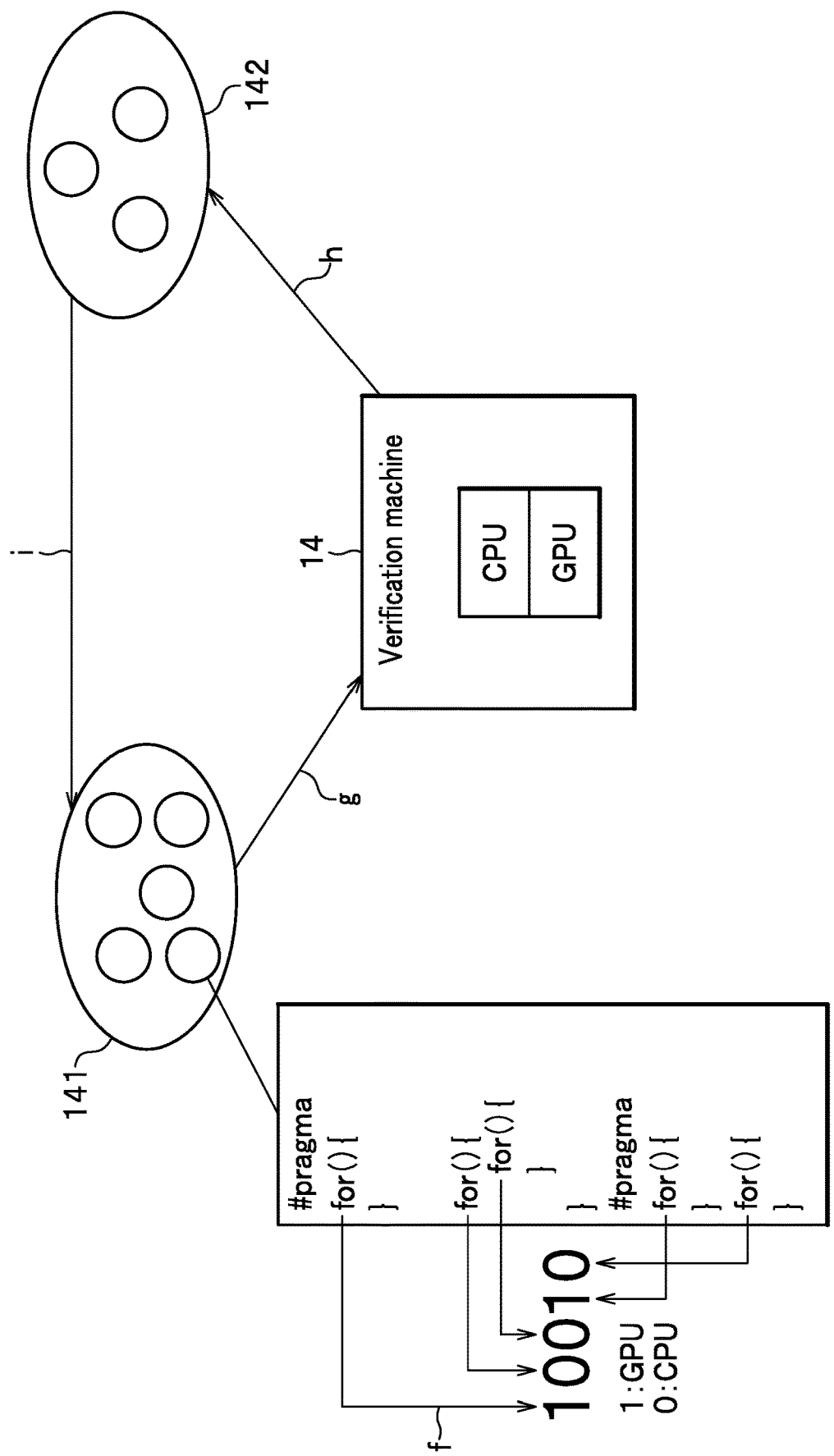
FIG. 5 is a diagram illustrating a concept of a search process by a control section (automatic offloading function section) using Simple GA of the offload server according to the embodiment.

FIG. 5 is a diagram illustrating a concept of a search process by a control section (automatic offloading function section) 11 using Simple GA. FIG. 5 illustrates the concept of the search process and illustrates gene sequence mapping of for statements.

GA is a combination optimization technique that mimics the evolutionary process of living organisms. The flowchart of the GA is: initialization→evaluation→selection→crossover→mutation→termination determination.

In the present embodiment, Simple GA, which uses simplified processing, will be used among GAs. Simple GA is a simplified GA, in which a gene consists only of 1's and 0's, roulette-wheel selection and one-point crossover are employed, and mutation is performed by flipping the value of the gene in one position from 1 to 0 or vice versa.

<Initialization>

In the initialization, the parallelizability of all the for statements in the application code is checked and then the parallelizable for statements are mapped to a gene sequence. When GPU processing is to be performed, 1 is set while when GPU processing is not to be performed, 0 is set. The genes are prepared for a specified M number of individuals in such a manner that one for statement is assigned a value of 1 or 0 randomly.

Specifically, the control section (automatic offloading function section) 11 (see FIG. 2) retrieves application code 130 (see FIG. 3) used by the user and checks the parallelizability of the for statements on the basis of the code patterns 141 of the application code 130 as illustrated in FIG. 5 As illustrated in FIG. 5, when five for statements are found in the code pattern 141 (see reference character f in FIG. 5), one digit of 1 or 0 is randomly assigned for each for statement, and here, five digits of 1 or 0 are assigned to the five for statements. For example, the cases in which the processing is to be performed by the CPU are assigned a value of 0, and the cases in which processing is to be outsourced to the GPU are assigned a value of 1. In this stage, however, a value of 1 or 0 is randomly assigned.

Code corresponding to a gene length consists of five digits and there are 25=32 patterns of code with a gene length of five digits, for example: 10001, 10010, . . . and so on. It should be noted that circles in the code pattern 141 conceptually represent the code in FIG. 5.

<Evaluation>

In the evaluation, deployment and performance measurement are performed (see reference character g in FIG. 5). Specifically, the performance measurement section 116 (see FIG. 3) compiles code corresponding to genes, deploys the compiled code to the verification machine 14, and executes the deployed code. The performance measurement section 116 performs a benchmark performance measurement. A gene corresponding to a pattern (parallel processing pattern) with good performance is given a higher degree of fitness.

<Selection>

In the selection, on the basis of the degree of fitness, high performance code patterns are selected (see reference character h in FIG. 5). On the basis of the degrees of fitness, the performance measurement section 116 (see FIG. 3) selects genes with high degrees of fitness as many as a specified number of individuals. The present embodiment performs roulette-wheel selection according to the degree of fitness and elite selection of selecting the gene with the highest degree of fitness.

FIG. 5 illustrates, as the concept of the search process, that the number of circles in selected code patterns 142 has decreased to three.

<Crossover>

In the crossover, some of the genes are swapped between selected individuals at one point at a certain crossover rate Pc to generate child individuals.

A gene of a certain pattern (parallel processing pattern) selected by roulette-wheel selection is crossed with a gene of another pattern. The position of the one-point crossover is arbitrary: for example, the crossover point may be the third digit in the five-digit code described above.

<Mutation>

In the mutation, values of a gene of an individual are changed from 0 to 1 or 1 to 0 at a certain mutation rate Pm.

Further, in order to avoid a local solution, mutation is introduced. It should be noted that, in some modes, mutation may be omitted in order to reduce the amount of computation.

<Determination of Termination>

As illustrated in FIG. 5, next-generation code patterns are generated after the crossover and mutation processes are performed (see reference character i in FIG. 5).

In the determination of termination, the process is terminated after the process is repeated a number of times equal to a specified T number of generations, and a gene with the highest degree of fitness is selected as the solution.

For example, performance measurement is performed and three fast patterns, 10010, 01001, and 00101 are selected. The three patterns are recombined in the next generation using the GA to generate a new pattern (parallel processing pattern) 10101 (an example). Here, mutation is introduced into the recombined patterns by, for example, automatically replacing 0 with 1. This process is repeated to find the fastest pattern. The specified number of generations (for example 20 generations) is defined and a pattern left in the last generation is selected as the final solution.

<Deployment>

With a parallel processing pattern having a highest processing performance corresponding to the gene with the highest degree of fitness, the deployment to the actual environment is performed anew to provide it to the user.

<Supplemental Remarks>

A description will be given of a case in which a considerable number of for statements (loop statements/iteration statements) that cannot be offloaded to a GPU are present. For example, even in a case in which 200 for statements are present, only about 30 for statements may be offloaded to a GPU. Here, the statements that cause errors are excluded and a GA is performed for the 30 statements.

OpenACC provides a compiler that allows specifying "#pragma acc kernels" directives to extract bytecode for GPU and to perform GPU offloading by executing the bytecode. By writing a command for a for statement in this #pragma, it is possible to determine whether the for statement can operate on the GPU.

In a case of using C/C++, the C/C++ code is analyzed to find for statements. When a for statement is found, a statement is written for the for statement using "#pragma acc kernels", which is a syntax defined in OpenACC for parallel processing. Specifically, for statements are inserted into an empty "#pragma acc kernels" one by one and compiled. If an error occurs for a for statement, the for statement cannot be processed by the GPU in the first place and thus is excluded. In this way, remaining for statements are found. Then, the number of statements that do not cause errors are used as the length (gene length). If the number of for statements not causing an error is 5, the gene length is 5: and if the number of for statements not causing an error is 10, the gene length is 10. Note that one that cannot be processed in parallel is a case with a data dependency in which a previous processing is used for the next processing.

The process up to here is in the preparation stage. The GA process is carried out next.

Up to here, code patterns with a gene length corresponding to the number of the for statements have been obtained. Initially, parallel processing patterns, e.g., 10010, 01001, 00101, . . . , are assigned randomly. GA processing is performed, and compilation is performed. In this event, an error could occur even with a for statement that is offloadable. This is the case in which the for statement is in a hierarchy (GPU processing is possible by designating either one of the hierarchy). In such a case, the for statement having caused the error may be retained. Specifically, it is conceivable to cause a timeout as if the timeout has been generated due to an increased processing time.

Deployment is performed on the verification machine 14 and, in the case of image processing, for example, the image processing is tested by benchmark testing and code patterns resulting in shorter processing time are evaluated as having a higher degree of fitness. For example, the evaluation is given as an inverse of the processing time. A value of 1 is given to processing that takes 10 seconds: a value of 0.1 is given to processing that takes 100 seconds: and a value of 10 is given to processing that takes 1 second.

For example, three to five code patterns with higher degrees of fitness are selected from 10 code patterns and recombined to generate new code patterns. In the course of the generation, a code pattern that is identical to a former code pattern may be generated. In such a case, the same data as before is used because the same benchmark testing does not need to be performed. In the present embodiment, code patterns and their processing times are stored in the storage section 13.

The concept of the search process by the control section (automatic offloading function section) 11 using Simple GA has been described above. A collective processing technique for data transfer will be described next.
[Collective Data Transfer Processing Technique]
<Basic Concept>

In order to reduce the number of transfers between a CPU and a GPU, the present invention transfers variables of nested loops, at an outermost possible level, and, in addition, concentrates the timing of transferring many variables and reduces the number of transfers that are caused by the compiler automatically.

To reduce the number of transfers, variables are transferred not only on a per nested-loop basis but are transferred such that variables for which the timing of transferring to the GPU can be concentrated are collectively transferred. For example, variables defined on a CPU and used in a plurality of loop statements, except those which are obtained as a result of processing by the GPU, then processed on the CPU, and then processed on the GPU again, can be collectively transferred to the GPU before the start of the GPU processing and can be returned to the CPU after the completion of the entire GPU processing.

As the loops and reference relationships between variables are identified when the code is analyzed, on the basis of the result thereof, a 'data copy' statement of OpenACC is used to designate a transfer of collectively transferring, of the variables defined in the plurality of files, those for which the GPU processing and the CPU processing are not nested and thus it is possible to separate the GPU processing and the CPU processing.

Variables that have been collectively transferred before the start of GPU processing and do not need to be transferred at the timing of loop statement processing are explicitly so indicated using 'data present'.

When data is to be transferred between the CPU and the GPU, a transfer is designated by creating (#pragma acc declare create) a temporary area, storing the data in the temporary area, and then synchronizing (#pragma acc update) the temporary area.

Comparative Examples

Comparative examples will be described first.

The comparative examples include a conventional CPU program (see FIG. 6), simple GPU use (see FIG. 7), and collective nest processing (Non-Patent Literature 2) (see FIG. 8). Incidentally, numbers <1> to <4> indicated after loop statements denoted in the succeeding description and in the drawings are given for the sake of convenience of explanation (the same applies to other figures and explanations thereof).

The loop statements in the ordinary CPU program illustrated in FIG. 6 are written on the CPU program side, where:
  loop <1>[for(i=0; i<10; i++)]{
  }
contains
loop <2>[for(j=0; j<20; j++)]{
}. Reference character j in FIG. 6 indicates setting of variables a, b in loop <2> above.
  Further,
  loop <3>[for(k=0; k<30; k++)]{
  }
  and
  loop <4>[for(l=0; l<40; l++)]{
  }
  follow. Reference character k in FIG. 6 represents setting of variables c, d in the loop <3> and reference character l in FIG. 6 represents setting of variables e, f in the loop <4>.

The conventional CPU program illustrated in FIG. 6 is executed on the CPU (no GPU is used).

Figure 7:
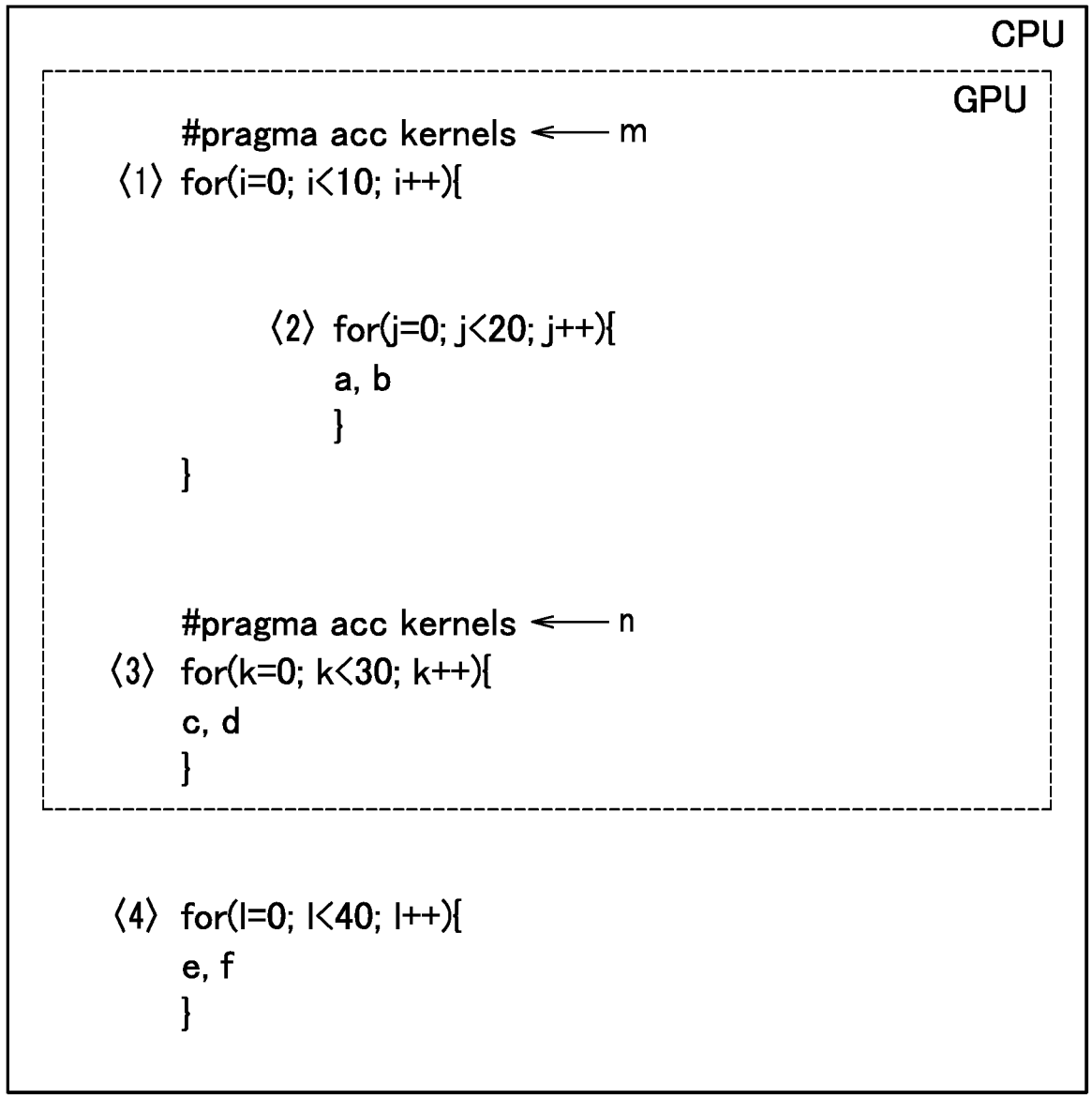
FIG. 7 is a diagram illustrating example loop statements in a case where data is transferred from a CPU to a GPU using a simple CPU program in a comparative example.

FIG. 7 is a diagram illustrating loop statements in the case where a data transfer from a CPU to a GPU is performed by simply using the GPU for the conventional CPU program illustrated in FIG. 6. The types of data transfer include a data transfer from CPU to GPU and a data transfer from GPU to CPU. In the following description, a data transfer from CPU to GPU is taken as an example.

The loop statements illustrated in FIG. 7, which simply use a GPU, are written in the CPU program side, where: loop <1>[for(i=0; i<10; i++)]{

}
contains
loop <2>[for(j=0; j<20: j++]{
}.

Further, as indicated by reference character m in FIG. 7, a processing portion such as for statements that can be parallelized by PGI compiler is designated with a directive #pragma acc kernels (statement specifying application of parallel processing) of OpenACC above loop <1>[for(i=0; i<10+i++]{
}.}.

As illustrated in the dashed box containing reference character m in FIG. 7, data is transferred from the CPU to the GPU according to #pragma acc kernels. Here, 10 transfers are performed since a and b are transferred at this timing.

Further, as indicated by reference character n in FIG. 7, a processing portion such as for statements that can be parallelized by PGI compiler is designated with a directive #pragma acc kernels of OpenACC above loop <3>[for k=0; k<30; k++)]{
}.

As illustrated in the dashed box containing reference character n in FIG. 7, c and d are transferred according to #pragma acc kernels at this timing.

Here, #pragma acc kernels is not specified above loop <4>[for(1=0; 1<40; 1++)]{ }. This loop is not processed on the GPU because processing of this loop on the GPU is inefficient.

FIG. 8 is a diagram illustrating loop statements in the case where data is transferred from the CPU to the GPU and from the GPU to the CPU using collective nest processing (Non-Patent Literature 2).

In the loop statement illustrated in FIG. 8, the CPU-to-GPU data transfer instruction line #pragma acc data copyin (a, b), a copyin clause of the variables a and b, is inserted at the position indicated by reference character o in FIG. 8.

The above-described #pragma acc data copyin(a, b) is specified at the outermost loop including neither setting nor definition of variables a, b (in this case, above loop <1>[for (i=0; i<10; i++)]{
}).

As a and b are transferred at the timing indicated in the dash-dotted box containing reference character o in FIG. 8, transfer occurs once.

In the loop statements illustrated in FIG. 8, the GPU-to-CPU data transfer instruction line #pragma acc data copyout (a,b), a copyout clause of variables a and b, is inserted at the position indicated by reference character p in FIG. 8.

The above-described #pragma acc data copyout(a, b) is specified below loop <1>[for(i=0; i<10; i++)]{
}.

In this way, in data transfer from the CPU to the GPU, data transfer is explicitly indicated by inserting a copyin clause of variables a, b: #pragma acc data copyin(a,b), at the position described above. This allows data transfers to be collectively performed at a time at the outermost possible loop, thereby avoiding inefficient transfer in which data is transferred at every loop iteration as in the simple use of GPU by the loop statements indicated by reference character m in FIG. 7.

Embodiment

The present embodiment will be described next.
<<Use of 'Data Present' to Explicitly Indicate Variables that Need not be Transferred>>

In the present embodiment, a 'data copy' statement of OpenACC is used to designate a transfer of collectively transferring, of the variables defined in the plurality of files, those for which the GPU processing and the CPU processing are not nested and thus it is possible to separate the GPU processing and the CPU processing. In addition, variables that have been collectively transferred and do not need to be transferred at the timing are explicitly indicated using 'data present'.

Figure 9:
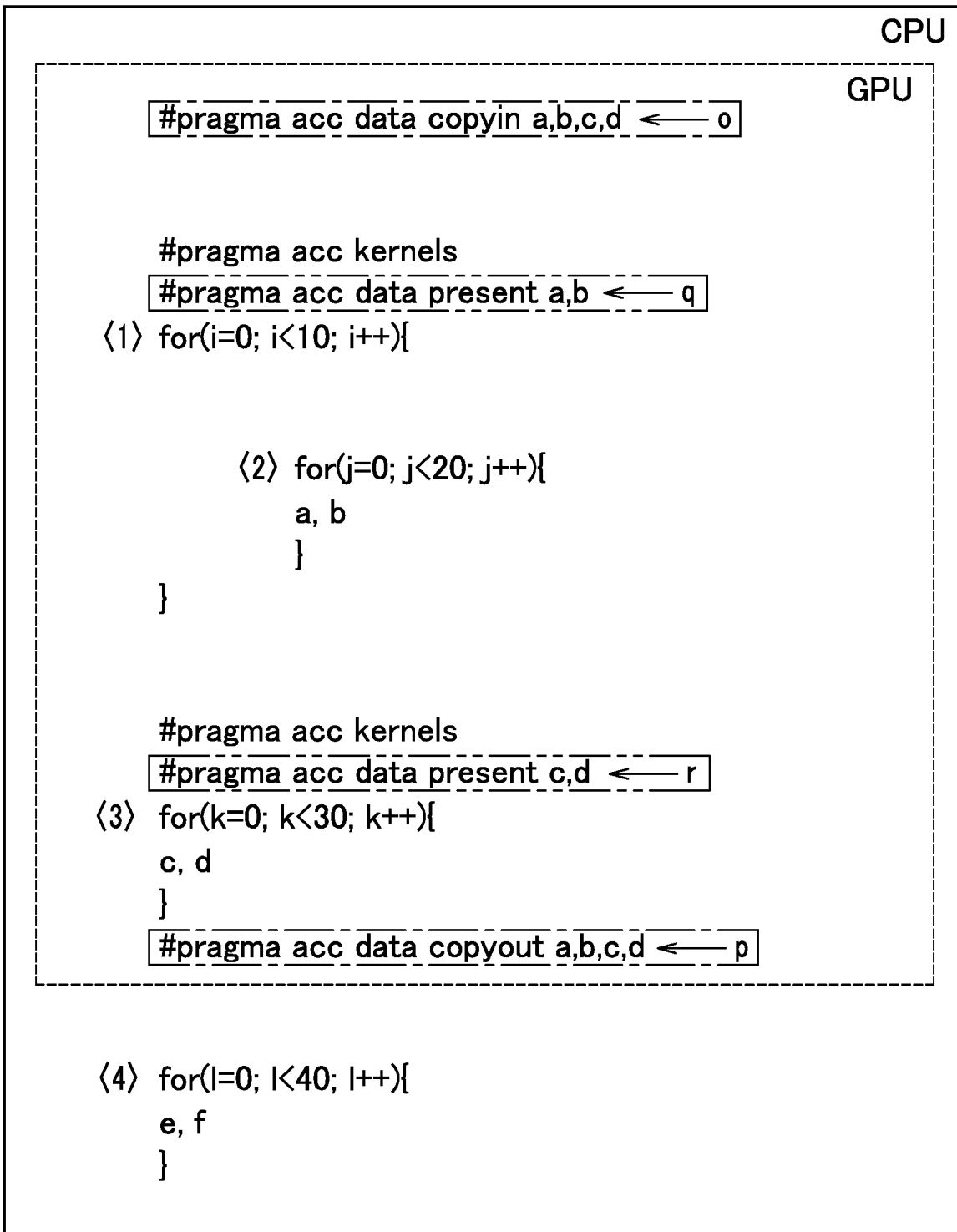
FIG. 9 is a diagram illustrating example loop statements in a case where data is transferred from a CPU to a GPU by the offload server employing collective transfers according to the embodiment.

FIG. 9 is a diagram illustrating loop statements for which collective transfers are employed according to the present embodiment for transfers between a CPU and a GPU. FIG. 9 corresponds to the collective nest processing of the comparative example in FIG. 8.

In the loop statements illustrated in FIG. 9, the CPU-to-GPU data transfer instruction line #pragma acc datacopyin (a, b, c, d), a copyin clause of the variables a, b, c, and d, is inserted at the position indicated by reference character o in FIG. 9.

The above-described #pragma acc data copyin (a, b, c, d) is specified at the outermost loop including neither setting nor definition of variables a, b, c, d (in this case, above loop <1>[for(i=0; i<10; i++)]{
}).

In this way, the 'data copy' statement #pragma acc data copyin(a, b, c, d) of OpenACC is used to designate a transfer of collectively transferring, of the variables defined in the plurality of files, those for which the GPU processing and the CPU processing are not nested and thus it is possible to separate the GPU processing and the CPU processing.

As a, b, c, and d are transferred at the timing indicated in the dash-dotted box containing reference character o in FIG. 9, transfer occurs once.

The variables that have been collectively transferred using the above-described #pragma acc data copyin(a, b, c, d) and need not be transferred at a certain timing are designated using 'data present' statement #pragma acc data present (a, b), which explicitly indicates that the variables are already on the GPU at the timing indicated in the long dashed double-short dashed line box containing reference character q in FIG. 9.

The variables that have been collectively transferred using the above-described #pragma acc data copyin(a, b, c, d) and need not be transferred at a certain timing are designated using 'data present' statement #pragma acc data present (c, d), which explicitly indicates that the variables are already on the GPU at the timing indicated in the long dashed double-short dashed line box containing reference character p in FIG. 9.

At the timing where loops <1> and <3> have been subjected to GPU processing and the GPU processing is finished, the GPU-to-CPU data transfer instruction line #pragma acc data copyout(a, b, c, d), which is a copyout clause of variables a, b, c, d, is inserted at position p at which loop <3> has been finished, as illustrated in FIG. 9.

Variables that can be collectively transferred using designation of collective transfer are collectively transferred, and variables that have been already transferred and need not be transferred are explicitly indicated using 'data present', thereby reducing the number of transfers to further improve efficiency of offloading means. However, even if transfer is specified according to OpenACC, some compilers may perform transfer due to its automatic determination. Automatic transfer by a compiler is an event in which, unlike the instruction according to OpenACC, a transfer between a CPU and a GPU that is actually unnecessary is nevertheless automatically performed in a manner of depending on the compiler.

<<Storing Data in Temporary Area>>

FIG. 10 is a diagram illustrating loop statements for which collective transfers are employed according to the present embodiment for transfers between a CPU and a GPU. FIG. 10 corresponds to the collective nest processing and the explicit indication of variables that need not be transferred, illustrated in FIG. 9.

In the loop statements illustrated in FIG. 10, a 'declare create' statement of OpenACC: #pragma acc declare create, which creates a temporary area when a transfer between a CPU and a GPU is performed, is specified at the position indicated by reference character s in FIG. 10. This causes a temporary area to be created (#pragma acc declare create) and causes data to be stored in the temporary area when a data transfer is performed between the CPU and GPU.

Moreover, an 'update' statement of OpenACC: #pragma acc update, which is used to synchronize the temporary area, is inserted at the position indicated by reference character t in FIG. 10, thereby instructing to perform a transfer.

In this way, a temporary area is created, and parameters are initialized in the temporary area to be used in the transfer between the CPU and the GPU, which avoids unnecessary transfers between the CPU and the GPU. Transfers that are not intended by OpenACC instructions and that degrade performance can be reduced.

[GPU Offload Processing]

By the above-described collective data transfer processing technique, loop statements appropriate for offloading can be extracted, and inefficient data transfer can be avoided.

However, some programs are not suitable for being offloaded to a GPU using the collective data transfer processing technique described above. In order for offloading to a GPU to be effective, it is necessary that the number of loop iterations of the processing to be offloaded be large.

In view of this, the present embodiment checks the number of loop iterations using a profiling tool in a preliminary step before a full-scale offload processing finding operation. As the number of executions of each line can be checked using a profiling tool, programs can be sorted out beforehand so that, for example, programs that have more than 50 million loop iterations are selected as programs to which an offload processing finding operation is to be applied. The process will be described below in detail (some portions of the description overlap portions of the description given with reference to FIG. 4).

In the present embodiment, first an application in which offload processing portions are to be searched for is analyzed to identify loop statements such as for, do, and while statements. Then, sample processing is performed, and the number of iterations of each loop statement is checked using the profiling tool and determination is made as to whether to perform a full-scale offload processing portion finding operation, based on whether there are loops that iterate a predetermined number of times or more.

When it is determined that a full-scale search operation is to be performed, GA processing is started (see FIG. 4 described above). In the initialization step, all loop statements in the application code are checked to determine whether they are parallelizable, then parallelizable loop statements are mapped to a gene sequence by setting 1 if GPU processing is to be performed and setting 0 if GPU processing is not to be performed. The genes are prepared for a specified number of individuals in such a manner that the values of each individual are each assigned a value of 1 or 0 randomly.

Here, in the code corresponding to a gene, an explicit data transfer instruction (#pragma acc data copyin/copyout/copy) is added according to the reference relationships of variable data in the loop statement designated as being subjected to GPU processing.

In the evaluation step, the code corresponding to the gene is compiled, deployed to a verification machine, and executed on the verification machine. Then, a benchmark performance measurement is performed. A gene corresponding to a pattern with good performance is given a higher degree of fitness. In the code corresponding to the gene, a parallel processing instruction line (see reference character j in FIG. 6, for example) and a data transfer instruction line (see reference character l in FIG. 6, reference character m in FIG. 7, and reference character o in FIG. 8, for example) are inserted, as described above.

In the selection step, genes with high degree of fitness as many as the specified number of individuals are selected based on the degree of fitness. The present embodiment performs roulette-wheel selection according to the degree of fitness and elite selection of selecting the gene with the highest degree of fitness. In the crossover step, some of the genes are swapped between selected individuals at one point at a certain crossover rate Pc, thereby generating child individuals. In the mutation step, values of a gene of an individual are changed from 0 to 1 or 1 to 0 at a certain mutation rate Pm.

After the mutation step is finished and next-generation genes as many as the specified number of individuals are generated, explicit data transfer instructions are added as in the initialization step, and the evaluation, selection, crossover, and mutation steps are repeated.

Lastly, at the termination determination step, the process is terminated after the process is repeated a number of times equal to a specified number of generations, the process is terminated and a gene with the highest degree of fitness is selected as the solution. With a code pattern having a highest performance corresponding to the gene with the highest degree of fitness, the deployment to the actual environment is performed anew to provide it to the user.

Hereinbelow, a description will be given of an implementation of the offload server 1. This implementation was made to confirm the validity of the present embodiment.

[Implementation]

A description will be given of an implementation that automatically offloads a C/C++ application using the general-purpose PGI compiler.

As the purpose of the implementation is to confirm the validity of the GPU automatic offloading, the target application is a C/C++ application and the GPU processing itself is described using conventional PGI compiler.

C/C++ languages are quite popular in the development of OSS (Open Source Software) and proprietary software. Many applications have been developed in C/C++ language. To verify the offloading of applications used by general users, we use OSS general applications such as one for cryptographic processing or image processing.

Processing for GPU is compiled with PGI compiler. PGI compiler is a compiler that interprets OpenACC for C/C++/

Fortran languages. In the present embodiment, parallelizable processing portions such as for statements are designated with an OpenACC directive, #pragma acc kernels (statement specifying application of parallel processing). This allows bytecode for GPU to be extracted and executed on the GPU, thereby enabling GPU offloading. The present embodiment issues an error in such a case that parallel processing is not possible due to the dependency between data in for statements or that plural hierarchies in nested for statements are specified. In addition, the present embodiment allows specifying explicit data transfers by directives #pragma acc data copyin/copyout/copy and the like.

Data transfer is explicitly specified by inserting #pragma acc data copyout(a[ . . . ]), which is the copyin clause of OpenACC, in the position described above in addition to the designation of "#pragma acc kernels (statement specifying application of parallel processing).

<Overview of Operation of Implementation>

An overview of operation of an implementation will be described.

For the implementation, the following process is performed.

Before starting the later-described process illustrated in FIGS. 11A and 11B, a C/C++ application to be accelerated and a benchmark testing tool for measuring the performance of the application are provided.

In the implementation, when a request for using the C/C++ application is received, the code of the C/C++ application is first analyzed to find for statements and identify a program structure regarding such as variable data used in the for statements. A syntax parsing library such as LLVM/Clang is used to parse syntax.

In the implementation, in order to estimate the possibility of effectiveness of GPU offloading on the application, benchmark testing is performed first and the number of loop iterations of the for statements identified in the syntax parsing is identified. For identifying the number of loop iterations, gcov of GNU coverage or the like is used. Known profiling tools include "GNU profiler (gprof)" and "GNU coverage (gcov)". Either one of these tools may be used since both tools can check the number of execution iterations of each line. Only an application that has more than 10 million loop iterations, for example, may be processed: the threshold value can be changed.

Implementations of general applications for CPU are not intended to be parallelized. Therefore, for statements for which GPU processing itself cannot be performed need to be excluded first. For each of the for statements, insertion of #pragma acc kernels directive for parallel processing is tried to determine whether an error occurs during compilation. There are several types of compilation errors. Examples of the compilation errors include: a case in which an external routine is called in a for statement: a case in which different nesting levels are duplicatively specified in nested for statements: a case in which there is a process that exits a for statement in the middle due to a break or the like; and a case in which there is a data dependency in data of a for statement. Types of errors that occur during compilation vary from application to application and errors other than discussed above may occur. Compilation errors are excluded from the processing and #pragma directives are not inserted.

Compilation errors are difficult to be processed automatically. In addition, it is often that processing compilation errors even results in no effect. In the case of calling an external routine, compilation errors could be sometimes avoided by "#pragma acc routine". However, most of the calls to an external routine is a library call. Even when the call is included in the GPU processing, the call becomes a bottleneck and good performance will not be achieved. As the for statements are processed for trial one by one, no compilation error occurs in connection with nesting. In the case of intermediate exiting with a break statement or the like, as the parallel processing requires the number of loops be fixed, the program needs to be modified. In the case of presence of data dependency, the parallel processing is in the first place impossible.

Assume that the number of loop statements that do not cause an error even when processed in parallel is A, the gene length is A. The application code is mapped to a gene with length A in such a manner that a gene element with a value of 1 corresponds to presence of a parallel processing directive and a gene element with a value of 0 corresponds to absence of a parallel processing directive.

Next, gene sequences as many as the specified number of individuals are prepared as initial values. Values of genes are generated by randomly allocating 0's and 1's as described with reference to FIG. 5. According to the provided gene sequences, when the value of a gene is 1, directives that designates GPU processing: ¥#pragma acc kernels, ¥#pragma acc parallel loop, and ¥#pragma acc parallel loop vector are inserted in the C/C++ code. Single loops and the like are not parallelized because PGI Compiler provides better performance with 'kernels' for the same processing. At this stage, in a code segment corresponding to a certain gene, a part to be processed by the GPU is determined.

The C/C++ code into which the parallel processing directives and data transfer directives are inserted is compiled by PGI compiler on a machine equipped with a GPU. The compiled execution file is deployed and the performance of the execution file is measured using a benchmark testing tool.

For all the individuals, after benchmark performance measurement is performed, a degree of fitness is set for each gene sequence in accordance with its benchmark processing time. In accordance with the set degree of fitness, individuals to be left are selected. The selected individuals are subjected to the GA processing of crossover, mutation, and faithful copy processes, to generate a group of individuals of the next generation.

For the next-generation individuals, insertion of directives, compilation, performance measurement, setting of degree of fitness, selection, crossover, and mutation processes are performed. When a gene that has a pattern identical to a former pattern is generated in the GA processing, the compilation and performance measurement are not performed for the individual and the same measurement value as before is used.

After the GA process has been completed for a specified number of generations, the C/C++ code in which directives have been added and which corresponds to the gene sequence with the highest performance is selected as the solution.

In the above-described processes, the number of individuals, the number of generations, the crossover rate, the mutation rate, setting of the degree of fitness, and the selection method are parameters of the GA and are specified separately. The proposed technique automates the above-described processes to enable automation of GPU offloading, which conventionally requires time and skill of specialized engineers.

Figure 11A:
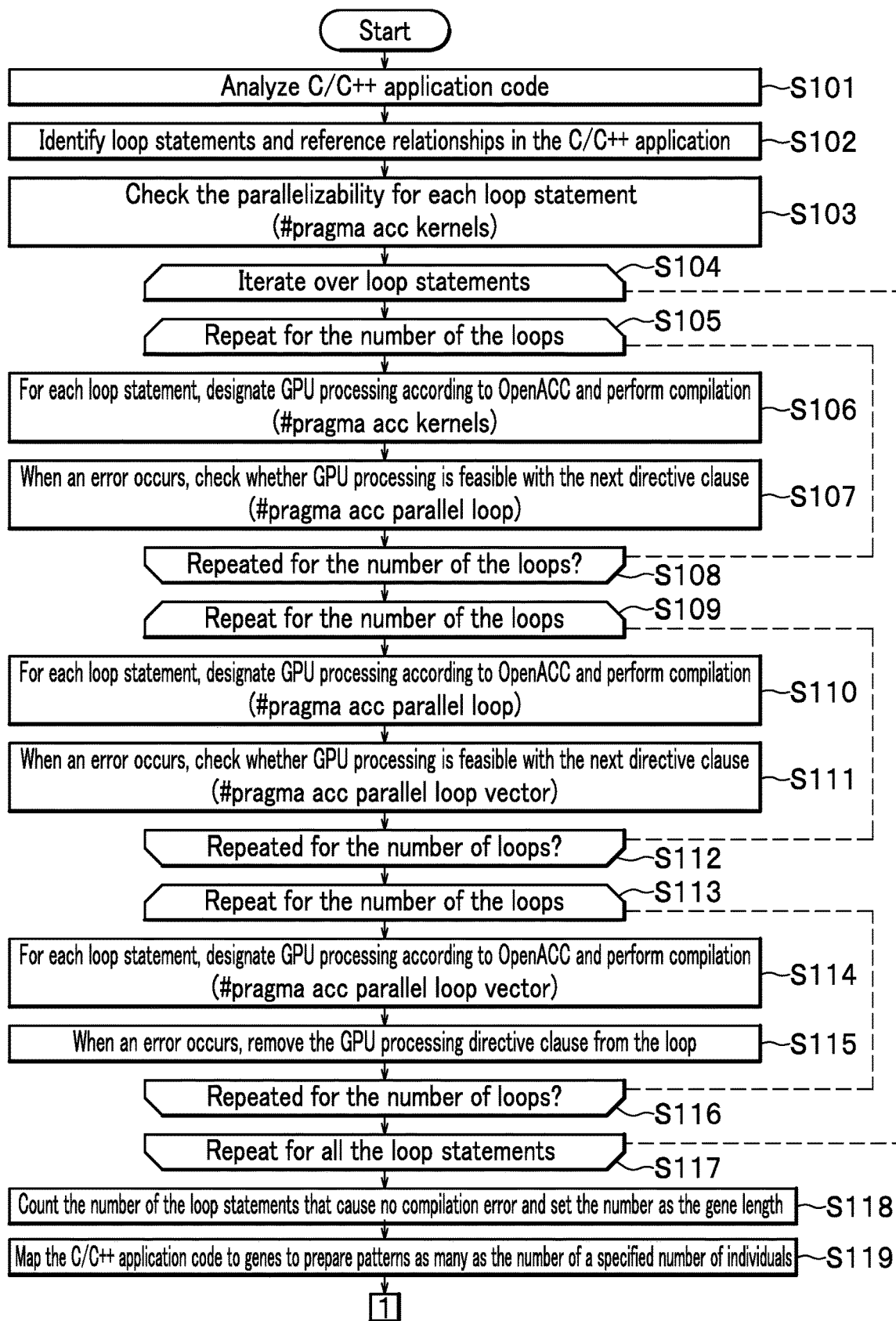
FIG. 11A is a flowchart for explaining an overview of operation of an implementation of the offload server according to the embodiment.
Figure 11B:
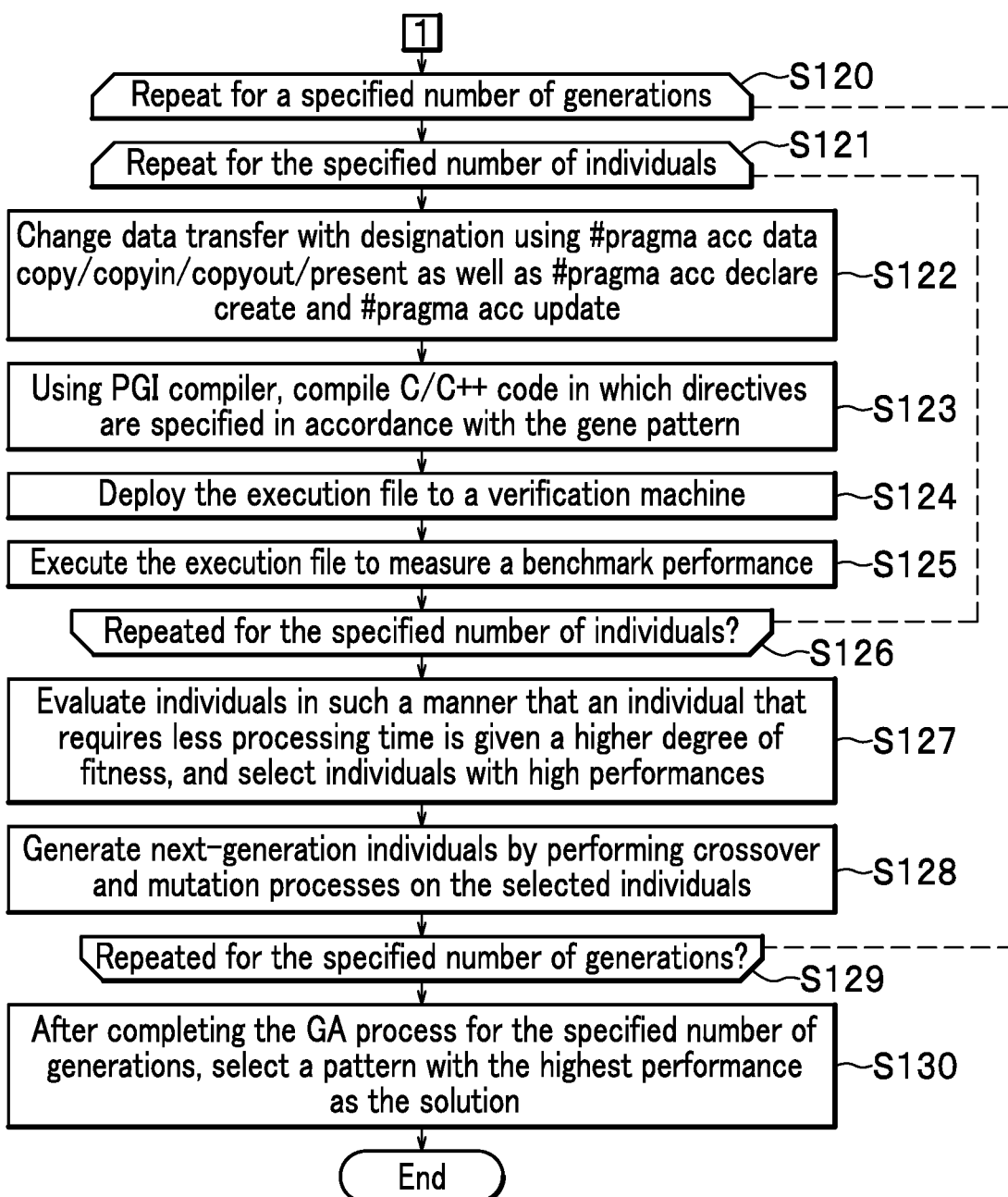
FIG. 11B is a flowchart for explaining an overview of operation of an implementation of the offload server according to the embodiment.

FIGS. 11A and 11B are flowcharts for explaining an overview of operation of the implementation described above. FIG. 11A and FIG. 11B are connected through a connector.

The following processing is performed using an OpenACC compiler designed for C/C++.

<Code Analysis>

In step S101, the application code analysis section 112 (see FIG. 3) analyzes the code of the C/C++ application.

<Identification of Loop Statements>

In step S102, the parallel processing designation section 114 (see FIG. 3) identifies loop statements and reference relationships in the C/C++ application.

<Parallelizability of Loop Statements>

In step S103, the parallel processing designation section 114 checks each loop statement to determine whether or not the loop statement can be processed on the GPU (#pragma acc kernels).

<Repetitions Over Loop Statements>

The control section (automatic offloading function section) 11 repeats the processes from step S105 to step S116 between the beginning of the loop at step S104 and the end of the loop at step S117 as many times as the number of the loop statements.

<Repetitions as Many Times as the Number of Loops (1)>

The control section (automatic offloading function section) 11 repeats the process from step S106 to step S107 between the beginning of the loop in step S105 and the end of the loop in step S108 as many times as the number of loop statements.

In step S106, the parallel processing designation section 114 designates GPU processing (#pragma acc kernels) in accordance with OpenACC for each loop statement and perform compilation.

When an error occurs, in step S107, the parallel processing designation section 114 checks whether GPU processing is feasible, using the next directive clause (#pragma acc parallel loop).

<Repetitions as Many Times as the Number of Loops (2)>

The control section (automatic offloading function section) 11 repeats the processes from step S110 to step S111 between the beginning of the loop at step S109 and the end of the loop at step S112 as many times as the number of the loop statements.

In step S110, the parallel processing designation section 114 designates GPU processing (#pragma acc parallel loop) in accordance with OpenACC for each loop statement and perform compilation.

When an error occurs, the parallel processing designation section 114 checks, in step S111, the next directive clause to determine whether or not GPU processing can be performed (#pragma acc parallel loop vector).

<Repetitions as Many Times as the Number of Loops (3)>

The control section (automatic offloading function section) 11 repeats the processes from step S114 to step S115 between the beginning of the loop at step S113 and the end of the loop at step S116 as many times as the number of the loop statements.

In step S114, the parallel processing designation section 114 designates GPU processing (#pragma acc parallel loop vector) in accordance with OpenACC for each loop statement and perform compilation.

In Step S115, the parallel processing designation section 114 removes the GPU processing directive clause from the loop statement when an error occurs.

<Count the Number of for Statements>

In step S118, the parallel processing designation section 114 counts the number of for statements at which no compilation error occurs and sets the number as the gene length.

<Provide as Many Patterns as the Specified Number of Individuals>

Next, the parallel processing designation section 114 provides, as initial values, as many gene sequences as the specified number of individuals. Here, the gene sequences are generated by randomly assigning O's and I's.

In step S119, the parallel processing designation section 114 provides as many patterns as the specified number of individuals by mapping the C/C++ application code to the genes.

According to the provided gene sequences, a directive that specifies parallel processing is inserted in the C/C++ code when the value of a gene is 1 (see #pragma directive in FIG. 5, for example).

The control section (automatic offloading function section) 11 repeats the processes from step S121 to step S128 between the beginning of the loop at step S120 and the end of the loop at step S129 as many times as the specified number of generations.

Further, in the repetitions as many times as the specified number of generations, the processes from step S122 to step S125 are repeated between the beginning of the loop at step S121 and the end of the loop at step S126 as many times as the specified number of individuals. In other words, the repetitions as many times as the specified number of individuals are performed in a nested manner in the iterations as many times as the specified number of generations.

<Designation of Data Transfer>

In step S122, the data transfer designation section 113 specifies, on the basis of reference relationships between variables, data transfer designation using explicit instruction line (#pragma acc data copy/copyin/copyout/present and #pragma acc declarecreate, #pragma acc update).

<Compilation>

In step S123, the parallel processing pattern generation section 115 (see FIG. 2) compiles the C/C++ code in which directives are specified in accordance with the gene pattern, using PGI Compiler. Specifically, the parallel processing pattern generation section 115 compiles the generated C/C++ code using PGI compiler on a verification machine 14 equipped with a GPU.

Here, a compilation error can occur for example when a plurality of nested for statements are designated for parallelization. Such a case is handled in the same way as a timeout of processing time during performance measurement.

In step S124, the performance measurement section 116 (see FIG. 2) deploys the execution file to the verification machine 14 equipped with a CPU and a GPU.

In step S125, the performance measurement section 116 executes the deployed binary file and measures benchmark performance obtained when offloading is performed.

Here, the measurement is not performed on a gene in an intermediate generation that has the same pattern as a gene in a former generation and the same value is used. In other words, when a gene that has a pattern identical to a former pattern is generated in the GA processing, the compilation and performance measurement are not performed for the individual and the same measurement value as before is used.

In step S127, the execution file generation section 117 (see FIG. 2) evaluates individuals in such a manner that an individual that results in a shorter processing time is given a higher degrees of fitness, and selects high-performance individuals.

In step S128, the execution file generation section 117 performs crossover and mutation processes on the selected individuals to generate next-generation individuals. The execution file generation section 117 performs compilation, performance measurement, setting of degree of fitness, selection, crossover, and mutation processes on the next-generation individuals.

Specifically, for all the individuals, after benchmark performance measurement is performed, a degree of fitness is set for each gene sequence in accordance with its benchmark processing time. In accordance with the set degree of fitness, individuals to be left are selected. The execution file generation section 117 performs GA processing of crossover, mutation, and faithful copy processes on the selected individuals to generate a group of individuals of the next generation.

In step S130, after the completion of the GA processing of a specified number of generations, the execution file generation section 117 selects C/C++ code that corresponds to the highest-performance gene sequence (highest-performance parallel processing pattern) as the solution.

<Parameters of GA>

The number of individuals, the number of generations, the crossover rate, the mutation rate, setting of the degree of fitness, and the selection method described above are parameters of GA. The parameters of the GA may be set as follows, for example.

For example, parameters and conditions of Simple GA performed may be set as follows.

Gene length: The number of parallelizable loop statements

Number of individuals M: A number less than or equal to the gene length

Number of generations T: A number less than or equal to the gene length

Degree of fitness: (Processing time)$^{(-1/2)}$

With these settings, the shorter the benchmark processing time, the higher the degree of fitness will become. Further, by setting the degree of fitness to processing time raised to the minus one-half power, it is possible to prevent a situation such that an excessively high degree of fitness is given to a certain individual whose processing time is short and thus the search range is narrowed. Further, when the performance measurement does not end within a certain period of time, the measurement is timed out and the degree of fitness is calculated by assuming that the processing time is 1000 seconds or so (a long time). The timeout time may be varied in accordance with performance measurement characteristics.

Selection: Roulette-wheel selection

However, elite preservation, in which a gene with the highest degree of fitness in a generation is preserved in the next generation without being subjected to crossover and mutation processes, is also performed.

Crossover rate Pc: 0.9

Mutation rate Pm: 0.05

<Cost Performance>

A description will be given of the cost performance of the automatic offloading.

Consulting the prices of the hardware of GPU boards such as NVIDIA Tesla, the price of a machine equipped with a GPU is about twice the price of a normal machine equipped with a CPU only. However, in general, regarding the cost of a data center or the like, the cost of hardware and system development is equal to or less than one-third of the total cost; the electricity bills and the operating cost of maintenance and operation systems, over one-third; and other costs such as service orders, about one-third. The present embodiment is capable of increasing the performance of time-consuming processing, e.g., cryptographic processing and/or image processing, of an application to be improved by a factor of two or more. Consequently, even when the price of the server hardware doubles, the cost effect can be fully expected.

According to the present embodiment, applications requiring a large execution time due to a large number of loop iterations are identified in advance using gcov and/or gprof or the like and the offloading is executed for trial. With this, applications that can be accelerated can be identified effectively.

<Time Until Starting Using Actual Service>

A description will be given of the time until starting using the actual service.

On the assumption that the time taken for one cycle of compilation to performance measurement is about three minutes for each time, it will take about 20 hours at most for a GA with 20 individuals and 20 generations to search for a solution, but it will take less than eight hours because the compilation and measurement of the same gene patterns as before are omitted. In many cloud, hosting, and network services, it takes about half a day to start using the service. The present embodiment is capable of performing automatic offloading within half a day for example. Assuming that the automatic offloading is finished within half a day and that the user can use the service for trial at the beginning, it is expected that user satisfaction will be sufficiently improved.

It is conceivable to use a plurality of verification machines as many as the number of the individuals to measure performance in parallel, in order to find the areas to be offloaded in a shorter period of time. Controlling the timeout time according to the application may also lead to the reduction of the time. For example, if the offloaded processing takes twice the time for the processing by CPU, the offloaded processing may be regarded as having timed out. In addition, the higher the number of individuals and the number of generations, the higher the possibility of finding a high-performance solution. However, setting these parameters to the maximum requires performing the compilation and performance benchmark testing for the number resulted in multiplying the number of individuals by the number of generations. It will take a longer time until starting the real service. In the case of the present embodiment, a relatively small numbers of individuals and generations are used compared to normal GA. However, by employing a crossover rate Pc of as high as 0.9, it is possible to find a solution with a certain performance in an early time.

[Extension of Directive Clauses]

In the present embodiment, directive clauses are extended in order to increase the number of applications to which the embodiment can be applied. Specifically, directive clauses for specifying GPU processing are extended to the 'parallel loop' directive clause and the 'parallel loop vector' directive clause in addition to the 'kernels' directive clause.

According to the OpenACC standard, 'kernels' is used for single loops and tightly nested loops. 'parallel loop' is used for loops including non-tightly nested loops. 'parallel loop vector' is used for loops that cannot be parallelized but vectorized. Here, a tightly nested loop is a simple nested loop nested such that when two loops that increment i and j are nested, processing using i and j is performed in the lower-level loop and not in the upper loop. According to the implementation of PGI Compiler and the like, there is a difference between 'kernels' and 'parallel" in that for 'kernels', the compiler determines whether to parallelize, whereas for 'parallel', a programmer determines whether to parallelize. It should be noted that in the case of Non-Patent Literature 2, the scope of application is narrow because Non-Patent Literature 2 addresses simple loops and does not address loop statements, such as non-tightly nested loops and loops that cannot be parallelized, that cause an error with 'kernels'.

In view of this, according to the present embodiment, 'kernels' is used for single and tightly nested loops and 'parallel loop' is used for non-tightly nested loops. In addition, 'parallel loop vector' is used for loops that cannot be parallelized but can be vectorized.

Here, the use of the parallel directive clauses can lead to lower reliability of results than when using 'kernels'. However, it is assumed that sample testing of a final offload program is performed, differences in results from results of processing on a CPU are checked, and the results of the check are presented to a user for confirmation. As CPUs and GPUs differ from each other in terms of hardware in the first place, they differ in the number of significant digits, rounding errors, and the like. For this reason, there is a need of checking the differences from the results obtained using the CPU even when using 'kernels' alone.

[Hardware Configuration]

Figure 12:
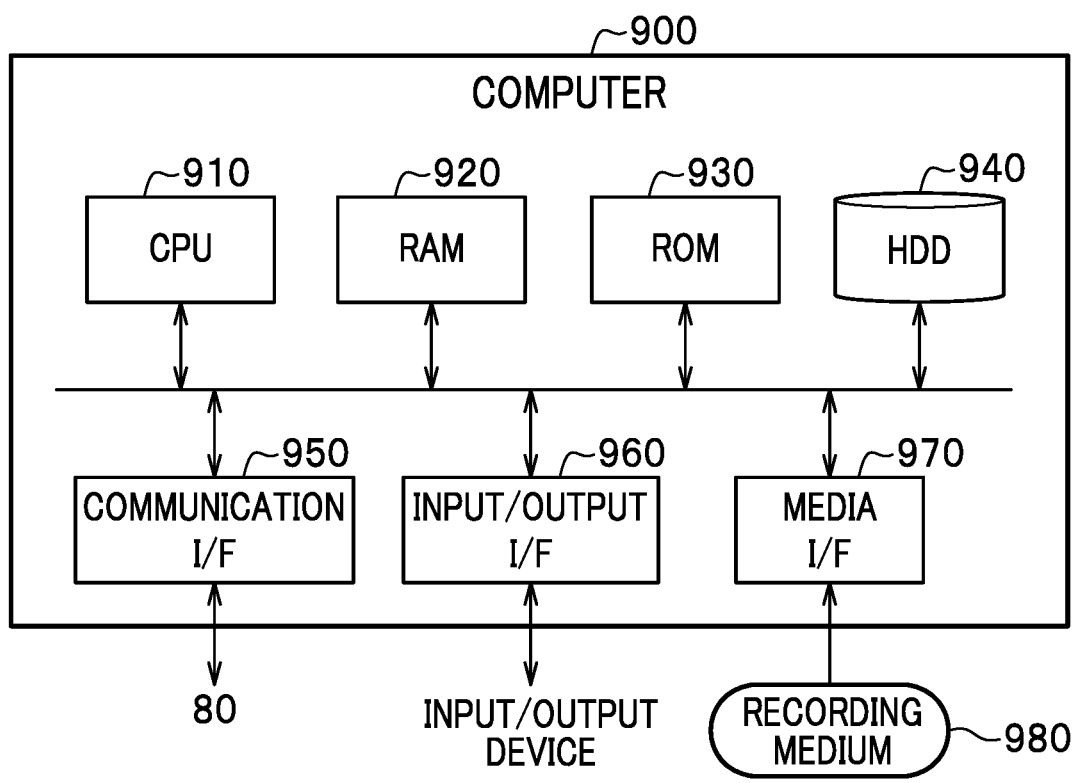
FIG. 12 is a hardware configuration diagram illustrating an example computer that implements the functions of the offload server according to an embodiment of the present invention.

The offload server 1 according to the present embodiment is embodied by, for example, a computer 900 having a configuration as illustrated in FIG. 12.

FIG. 12 is a hardware configuration diagram illustrating an example of computer 900 that embodies the functions of offload server 1.

Computer 900 includes a CPU 910, a RAM 920, a ROM 930, an HDD 940, a communication interface (I/F: Interface) 950, an input/output interface (I/F) 960, and a media interface (I/F) 970.

CPU 910 operates and performs control of each portion according to a program stored in ROM 930 or HDD 940. ROM 930 stores a boot program to be executed by CPU 910 when computer 900 starts up, a program that relies on the hardware of computer 900, and the like.

HDD 940 stores programs to be executed by CPU 910, data to be used by the programs, and the like. Communication interface 950 receives data from another device via a communication network 80, sends the received data to CPU 910, and transmits data generated by CPU 910 to another device via communication network 80.

CPU 910 controls an output device such as a display or a printer and an input device such as a keyboard or a mouse via input/output interface 960. CPU 910 receives data from the input device via input/output interface 960. Also, CPU 910 outputs generated data to the output device via input/output interface 960.

Media interface 970 reads a program or data stored in a recording medium 980 and provides the read program or data to CPU 910 via RAM 920. CPU 910 loads the program from recording medium 980 onto RAM 920 via media interface 970 and executes the loaded program. Recording medium 980 is, for example, an optical recording medium such as a DVD (Digital Versatile Disc) or PD (Phase change rewritable Disk), a magneto-optical recording medium such as an MO (Magneto Optical disk), a tape medium, a magnetic recording medium, a semiconductor memory, or the like.

For example, if computer 900 functions as an offload server 1 according to the present embodiment, CPU 910 of computer 900 embodies the function of each portion of offload server 1 by executing the program loaded on RAM 920. Also, HDD 940 stores the data in each portion of offload server 1. CPU 910 of computer 900 reads these programs from recording medium 980 and executes them, but in another example, these programs may be received from another device via communication network 80.

[Effects]

As has been described above, the offload server 1 according to the present embodiment includes the application code analysis section 112 configured to analyze source code of an application: the data transfer designation section 113 configured to, on the basis of a result of the code analysis, designate a data transfer to be collectively performed on, before starting GPU processing and after finishing the GPU processing, of the variables that need to be transferred between the CPU and the GPU, those which are not mutually referenced nor mutually updated between CPU processing and the GPU processing and which are only to be returned to the CPU as the result of the GPU processing: the parallel processing designation section 114 configured to identify loop statements in the application, and, for each of the identified loop statements, specify a statement specifying application of parallel processing by the GPU and perform compilation; the parallel processing pattern generation section 115 configured to exclude, from loop statements to be offloaded, any loop statement at which a compilation error occurs and to generate parallel processing patterns which specify whether to perform parallel processing for the loop statements at which no compilation error occurs: the performance measurement section 116 configured to compile the application according to the parallel processing pattern, deploy the compiled application to the accelerator verification device 14, and perform processing for a measurement of a performance obtained when offloading the compiled application to the accelerator: and the execution file generation section 117 configured to select a parallel processing pattern with a highest processing performance from a plurality of the parallel processing patterns on the basis of a result of the measurement of the performance, and compile the parallel processing pattern with the highest processing performance to generate an execution file.

In this way, the number of transfers between a CPU and a GPU can be reduced to further accelerate offloading by collectively transferring variables that can be collectively transferred and providing directions for the variables, instead of individually transferring directions (such as data copy) that are dispersed in a program to the GPU.

The data transfer designation section 113 of the offload server 1 designates the data transfer to be collectively performed before starting the GPU processing and after finishing the GPU processing, using 'data copy' of OpenACC.

In this way, variables that can be collectively transferred are collectively designated and transferred together to reduce transfers between the CPU and the GPU, leading to further acceleration of the offloading.

When variables to be processed on the GPU already have been collectively transferred, the data transfer designation section 113 of the offload server 1 adds a directive clause indicating that transfer is unnecessary.

In this way, regarding the event in which a transfer between a CPU and a GPU that is actually unnecessary is nevertheless automatically performed, such transfer is avoided by additionally specifying a directive clause indicating that transfer is unnecessary. As a result, unnecessary transfer between the CPU and the GPU is avoided to further accelerate offloading.

For variables that have been collectively transferred before the start of the GPU processing and need not be transferred at the timing of loop statement processing, the data transfer designation section 113 of the offload server 1 uses 'data present' of OpenACC to explicitly indicate that the variables need not be transferred.

In this way, using 'data present' of OpenACC, unnecessary CPU-GPU transfer can be prevented to further accelerate offloading.

The data transfer designation section 113 of the offload server 1 designates, in the event of transferring data between the CPU and the GPU, a transfer of variables by creating (#pragma acc declare create) a temporary area on the GPU side, storing the data in the temporary area, and then synchronizing (#pragma acc update) the temporary area.

In this way, by creating a temporary area and specifying the timing of the transfer between the CPU and the GPU, the transfer automatically performed in a manner depending on the compiler can be prevented, leading to further acceleration of the offloading.

In the offload server 1, the parallel processing designation section 114 is further configured to set a gene length to the number of the loop statements at which no compilation error occurs, according to a genetic algorithm: the parallel processing pattern generation section 115 is further configured to prepare gene patterns as many as a specified number of individuals, wherein each of the gene patterns has elements whose gene values are randomly assigned a value of 1 or 0 and GPU processing availability is mapped to the value in such a manner that performing GPU processing is assigned either 1 or 0 and not performing GPU processing is assigned either the opposite 0 or 1: the performance measurement section 116 is further configured to: for each of the current-generation individuals, compile an application code in which statements specifying application of parallel processing by the GPU are specified, deploy the compiled code to the accelerator verification device 14, and perform processing for a measurement of a performance of the individual on the accelerator verification device, and the execution file generation section 117 is further configured to perform performance measurement for each individual, evaluate the individual in such a manner that an individual that requires less processing time period is regarded as having a higher degree of fitness, select individuals having degrees of fitness higher than a predetermined value from each individual as individuals with high performances, generate next-generation individuals by performing crossover and mutation processes on the selected individuals, and after completing processing for a specified number of generations, select a parallel processing pattern with a highest performance as the solution.

In this way, parallelizable loop statements are checked first, then appropriate areas are searched for while repeating a performance verification trial on a group of parallelizable iteration statements in a verification environment by using the GA. By narrowing down to the parallelizable loop statements (e.g., for statements) and holding and recombining a parallel processing pattern that may possibly achieve acceleration in a form of a part of gene, a pattern that achieves acceleration can be efficiently found from an enormous number of parallel processing patterns that can be made.

The present invention provides an offload program for causing a computer to function as the offload server described above.

Thus, the functions of the offload server 1 described above can be implemented using a commonly used computer.

Among the processing described in the embodiment, all or some of the processing described as being performed automatically may be performed manually, or all or some of the processing described as being performed manually may be performed automatically using a known method. In addition, information including process procedures, control procedures, specific names, various types of data and parameters described and illustrated in the description and drawings may be changed as appropriate unless otherwise stated.

Further, the components of the devices illustrated in the drawings are functionally conceptual and do not necessarily need to be physically configured as illustrated. In other words, specific form of distribution and integration of the devices are not limited to those illustrated in the drawings and all or some of the devices can be distributed or integrated functionally or physically in any units according to various loads and usages.

Further, some or all of the configurations, functions, processing units, processing means and the like described above may be implemented in hardware by, for example, designing them in integrated circuits. Further, the configurations, functions and the like described above may be implemented in software that causes a processor to interpret and execute a program that implements the functions. The program that implements the functions and information such as tables and files can be held in a recording device such as a memory, a hard disk, or an SSD (Solid State Drive) or a recording medium such as an IC (Integrated Circuit) card, an SD (Secure Digital) card, or an optical disc.

Further, in the present embodiment, while a genetic algorithm (GA) technique is used in order to allow a solution to a combinational optimization problem to be found in a limited optimization period, any optimization technique may be used. For example, local search, Dynamic Programming, or a combination of both may be used.

Moreover, although the present embodiment uses OpenACC compiler for C/C++, any compiler that can offload processing to a GPU can be used. For example, Java lambda (registered trademark) GPU processing of IBM Java 9 SDK (registered trademark) may be used. It should be noted that the statements specifying application of parallel processing depend on these development environments.

For example, Java (registered trademark) 8 or later allows description of parallel processing in the lambda format. IBM (registered trademark) provides a JIT compiler that converts parallel processing descriptions in the lambda format to GPU offloading. When using Java, using these, performing GA to tune as to whether to convert loop processing into lambda format makes it possible to perform the same offloading.

In the description of the present embodiment, for statements are exemplified as iteration statements (loop statements). However, the iteration statements include while statements and do-while statements other than for statements. However, for statements, which specifies the continuation conditions or the like, are more suitable.

REFERENCE SIGNS LIST

1 Offload server
11 Control section
12 Input/Output section
13 Storage section
14 Verification machine (accelerator verification device)
15 OpenIoT resource
111 Application code designation section
112 Application code analysis section
113 Data transfer designation section
114 Parallel processing designation section
114a Offload area extraction section 114*b* Intermediate language file output section
115 Parallel processing pattern generation section
116 Performance measurement section
116*a* Binary file deployment section
117 Execution file generation section
118 Actual environment deployment section
119 Performance measurement test extraction and execution section
120 Provision-to-user section
130 Application code
131 Test case database
132 Intermediate language file
151 Various types of devices
152 CPU-GPU-equipped device
153 CPU-FPGA-equipped device
154 CPU-equipped device

The invention claimed is:

1. An offload server that offloads specific processing of an application to a GPU (Graphics Processing Unit), the offload server comprising:
one or more hardware processors;
an application code analysis section, implemented using the one or more hardware processors, configured to analyze source code of an application;
a data transfer designation section, implemented using the one or more hardware processors, configured to, on the basis of based on a result of the code analysis, insert first directives to the source code to designate data transfers to be collectively performed on, before starting GPU processing and after finishing the GPU processing, selected ones of variables that need to be transferred between a CPU (Central Processing Unit) and the GPU, the selected ones being not mutually referenced nor mutually updated between CPU processing and the GPU processing and being only to be returned to the CPU as a result of the GPU processing, while inserting second directives to the source code to prevent a compiler from generating a code that automatically transfers the selected ones during the GPU processing;
a parallel processing designation section, implemented using the one or more hardware processors, configured to identify loop statements in the application, and, for each of the identified loop statements, specify a statement specifying application of parallel processing by the GPU and perform compilation;
a parallel processing pattern generation section, implemented using the one or more hardware processors, configured to exclude, from loop statements to be offloaded, any loop statement causing a compilation error and to generate a plurality of parallel processing patterns, each specifying whether to perform parallel processing for each of the loop statements causing no compilation error;
a performance measurement section, implemented using the one or more hardware processors, configured to, for each of the plurality of parallel processing patterns, compile the application according to the parallel processing pattern, deploy the compiled application to an accelerator verification device, and perform processing for a measurement of a performance obtained when offloading the compiled application to the GPU according to the parallel processing pattern; and
an execution file generation section, implemented using the one or more hardware processors, configured to select a parallel processing pattern with a highest processing performance as a solution from the plurality of parallel processing patterns on the basis of based on a result of the measurement of the performance, and compile the application according to the parallel processing pattern with the highest processing performance to generate an execution file.

2. The offload server according to claim 1, wherein the data transfer designation section is configured to designate the data transfer to be collectively performed before starting the GPU processing and after finishing the GPU processing, using a data copy statement of OpenACC (Open Accelerator).

3. The offload server according to claim 1, wherein when a variable to be processed on the GPU has been already collectively transferred to the GPU, the data transfer designation section is configured to add a directive clause indicating that the variable need not be transferred.

4. The offload server according to claim 1, wherein the data transfer designation section is configured to explicitly indicate that transfer is not necessary for variables that are collectively transferred before start of the GPU processing and need not be transferred at timing of loop statement processing, using a data present statement of OpenACC.

5. The offload server according to claim 1, wherein the data transfer designation section is configured to designate, in the event of transferring data between the CPU and the GPU, a transfer of a variable by creating a temporary area on a GPU side, storing data of the variable in the temporary area, and then synchronizing the temporary area.

6. The offload server according to claim 1,
wherein the parallel processing designation section is further configured to set a gene length to the number of the loop statements causing no compilation error, according to a genetic algorithm,
wherein the parallel processing pattern generation section is further configured to prepare gene patterns as many as a specified number of current-generation individuals, wherein each of the gene patterns has elements whose gene values are each randomly assigned a value of 1 or 0 and GPU processing availability is mapped to the value in a manner that performing GPU processing is assigned either 1 or 0 and not performing GPU processing is assigned either the opposite 0 or 1,
wherein the performance measurement section is further configured to: for each of the current-generation individuals, compile an application code in which statements specifying application of parallel processing by the GPU are specified, deploy the compiled code to the accelerator verification device, and perform processing for a measurement of a performance of the individual on the accelerator verification device, and
wherein the execution file generation section is further configured to perform performance measurement for each individual, evaluate the individual in a manner that an individual that requires less processing time period is regarded as having a higher degree of fitness, select individuals having degrees of fitness higher than a predetermined value from all the individuals, generate next-generation individuals by performing crossover and mutation processes on the selected individuals, and after completing processing for a specified number of generations, select a parallel processing pattern with a highest performance as the solution.

7. An offload control method for an offload server that offloads specific processing of an application to a GPU (Graphics Processing Unit), the offload server comprising one or more hardware processors, wherein the offload control method causing the offload server to perform steps of:
  analyzing source code of an application;
  based on a result of the code analysis, inserting first directives to the source code to designate data transfers to be collectively performed on, before starting GPU processing and after finishing the GPU processing, selected ones of variables that need to be transferred between a CPU (Central Processing Unit) and the GPU, the selected ones being not mutually referenced nor mutually updated between CPU processing and the GPU processing and being only to be returned to the CPU as the result of the GPU processing, while inserting second directives to the source code to prevent a compiler from generating a code that automatically transfers the selected ones during the GPU processing;
  identifying loop statements in the application, and, for each of the identified loop statements, specifying a statement specifying application of parallel processing by the GPU and performing compilation;
  excluding, from loop statements to be offloaded, any loop statement causing a compilation error;
  generating a plurality of parallel processing patterns each specifying whether to perform parallel processing for each of the loop statements causing no compilation error;
  for each of the plurality of parallel processing patterns, compiling the application according to the parallel processing pattern, deploying the compiled application to an accelerator verification device, and performing processing for a measurement of a performance obtained when offloading the compiled application to the GPU according to the parallel processing pattern; and
  selecting a parallel processing pattern with a highest processing performance as a solution from the plurality of parallel processing patterns based on a result of the measurement of the performance, and compiling the application according to the parallel processing pattern with the highest processing performance to generate an execution file.

8. A non-transitory computer-readable medium storing a computer program configured to cause an offload server to perform operations to offload specific processing of an application to a GPU (Graphics Processing Unit), the operations comprising:
  analyzing source code of an application;
  based on a result of the code analysis, inserting first directives to the source code to designate data transfers to be collectively performed on, before starting GPU processing and after finishing the GPU processing, selected ones of variables that need to be transferred between a CPU (Central Processing Unit) and the GPU, the selected ones being not mutually referenced nor mutually updated between CPU processing and the GPU processing and being only to be returned to the CPU as a result of the GPU processing, while inserting second directives to the source code to prevent a compiler from generating a code that automatically transfers the selected ones during the GPU processing;
  identifying loop statements in the application, and, for each of the identified loop statements, specifying a statement specifying application of parallel processing by the GPU and perform compilation;
  excluding, from loop statements to be offloaded, any loop statement causing a compilation error;
  generating a plurality of parallel processing patterns each specifying whether to perform parallel processing for each of the loop statements causing no compilation error;
  for each of the plurality of parallel processing patterns, compiling the application according to the parallel processing pattern, deploy the compiled application to an accelerator verification device, and performing processing for a measurement of a performance obtained when offloading the compiled application to the GPU according to the parallel processing pattern; and
  selecting a parallel processing pattern with a highest processing performance as a solution from the plurality of parallel processing patterns of based on a result of the measurement of the performance, and compiling the application according to the parallel processing pattern with the highest processing performance to generate an execution file.

9. The offload control method according to claim 7, further comprising:
  designating the data transfer to be collectively performed before starting the GPU processing and after finishing the GPU processing, using a data copy statement of OpenACC (Open Accelerator).

10. The offload control method according to claim 7, further comprising:
  when a variable to be processed on the GPU has been already collectively transferred to the GPU, adding a directive clause indicating that the variable need not be transferred.

11. The offload control method according to claim 7, further comprising:
  explicitly indicating that transfer is not necessary for variables that are collectively transferred before start of the GPU processing and need not be transferred at timing of loop statement processing, using a data present statement of OpenACC.

12. The offload control method according to claim 7, further comprising:
  designating, in the event of transferring data between the CPU and the GPU, a transfer of a variable by creating a temporary area on a GPU side, storing data of the variable in the temporary area, and then synchronizing the temporary area.

13. The offload control method according to claim 7, further comprising:
  setting a gene length to the number of the loop statements causing no compilation error, according to a genetic algorithm,
  preparing gene patterns as many as a specified number of current-generation individuals, wherein each of the gene patterns has elements whose gene values are each randomly assigned a value of 1 or 0 and GPU processing availability is mapped to the value in a manner that performing GPU processing is assigned either 1 or 0 and not performing GPU processing is assigned either the opposite 0 or 1,
  for each of the current-generation individuals, compiling an application code in which statements specifying application of parallel processing by the GPU are specified, deploying the compiled code to the accelerator verification device, and performing processing for a measurement of a performance of the individual on the accelerator verification device, and
  performing performance measurement for each individual, evaluating the individual in a manner that an individual that requires less processing time period is regarded as having a higher degree of fitness, selecting individuals having degrees of fitness higher than a predetermined value from all the individuals, generating next-generation individuals by performing crossover and mutation processes on the selected individuals, and after completing processing for a specified number of generations, selecting a parallel processing pattern with a highest performance as the solution.

14. The non-transitory computer-readable medium according to claim 8, wherein the operations further comprises:
designating the data transfer to be collectively performed before starting the GPU processing and after finishing the GPU processing, using a data copy statement of OpenACC (Open Accelerator).

15. The non-transitory computer-readable medium according to claim 8, wherein the operations further comprises:
when a variable to be processed on the GPU has been already collectively transferred to the GPU, adding a directive clause indicating that the variable need not be transferred.

16. The non-transitory computer-readable medium according to claim 8, wherein the operations further comprises:
explicitly indicating that transfer is not necessary for variables that are collectively transferred before start of the GPU processing and need not be transferred at timing of loop statement processing, using a data present statement of OpenACC.

17. The non-transitory computer-readable medium according to claim 8, wherein the operations further comprises:
designating, in the event of transferring data between the CPU and the GPU, a transfer of a variable by creating a temporary area on a GPU side, storing data of the variable in the temporary area, and then synchronizing the temporary area.

18. The non-transitory computer-readable medium according to claim 8, wherein the operations further comprises:
setting a gene length to the number of the loop statements causing no compilation error occurs, according to a genetic algorithm,
preparing gene patterns as many as a specified number of current-generation individuals, wherein each of the gene patterns has elements whose gene values are each randomly assigned a value of 1 or 0 and GPU processing availability is mapped to the value in a manner that performing GPU processing is assigned either 1 or 0 and not performing GPU processing is assigned either the opposite 0 or 1,
for each of the current-generation individuals, compiling an application code in which statements specifying application of parallel processing by the GPU are specified, deploying the compiled code to the accelerator verification device, and performing processing for a measurement of a performance of the individual on the accelerator verification device, and
performing performance measurement for each individual, evaluating the individual in a manner that an individual that requires less processing time period is regarded as having a higher degree of fitness, selecting individuals having degrees of fitness higher than a predetermined value from all the individuals, generating next-generation individuals by performing crossover and mutation processes on the selected individuals, and after completing processing for a specified number of generations, selecting a parallel processing pattern with a highest performance as the solution.

* * * * *